US012673254B2

(12) United States Patent
    Evans

(10) Patent No.:  US 12,673,254 B2
(45) Date of Patent:      Jul. 7, 2026

(54) GAME SYSTEMS AND METHODS

(71) Applicant: The Upper Deck Company, Carlsbad, CA (US)

(72) Inventor: Matthew Evans, West Valley, UT (US)

(73) Assignee: The Upper Deck Company, Carlsbad, CA (US)

( * ) Notice: Subject to any disclaimer, the term of this patent is extended or adjusted under 35 U.S.C. 154(b) by 167 days.

(21) Appl. No.: 18/616,549

(22) Filed: Mar. 26, 2024

(65) Prior Publication Data

US 2024/0325869 A1      Oct. 3, 2024

Related U.S. Application Data

(60) Provisional application No. 63/454,805, filed on Mar. 27, 2023.

(51) Int. Cl.
    *A63F 1/04*       (2006.01)
    *A63F 1/00*       (2006.01)
    *A63F 1/02*       (2006.01)
    *A63F 13/537*     (2014.01)

(52) U.S. Cl.
    CPC ................. *A63F 1/04* (2013.01); *A63F 1/02* (2013.01); *A63F 13/537* (2014.09); *A63F 2001/008* (2013.01); *A63F 2001/0483* (2013.01)

(58) Field of Classification Search
    CPC .. A63F 1/02; A63F 1/04; A63F 13/537; A63F 2001/008; A63F 2001/0483
    See application file for complete search history.

(56) References Cited

U.S. PATENT DOCUMENTS

| | | | |
|---|---|---|---|
| 8,448,947 B2 | 5/2013 | McAndrew et al. | |
| 8,814,165 B2 | 8/2014 | McAndrew et al. | |
| 11,083,957 B2 | 8/2021 | Swiderski | |
| 2004/0036220 A1 | 2/2004 | Tanaka | |
| 2005/0151320 A1 | 7/2005 | Gress | |
| 2007/0057459 A1 | 3/2007 | Silva | |
| 2007/0235940 A1 | 10/2007 | Stuart et al. | |
| 2015/0001798 A1 | 1/2015 | Blue | |
| 2017/0157500 A1 | 6/2017 | Castro | |
| 2018/0304158 A1 * | 10/2018 | Miyamae .............. | A63F 13/533 |
| 2022/0305367 A1 | 9/2022 | Moteki et al. | |

OTHER PUBLICATIONS

USPTO; Notice of Allowance dated Dec. 31, 2025 in U.S. Appl. No. 18/609,881.
USPTO; Non-Final Office Action dated Feb. 4, 2026 in U.S. Appl. No. 18/635,824.

* cited by examiner

*Primary Examiner* — Thomas H Henry
(74) *Attorney, Agent, or Firm* — Snell & Wilmer L.L.P.

(57)             ABSTRACT

A method can comprise conducting trick phases comprising players playing suit cards each having a suit value. A player can play one or more suit cards, and an opponent can play one or more suit cards. A trick phase winner can be determined based on the total suit value of each player's played suit cards. The trick phase winner can collect all played suit cards, which can be called trick cards. There can be one or more active enemy cards, and the trick phase winner can assign the trick cards as damage to the active enemy cards as desired. In response to an active enemy card being defeated by the assigned trick cards, a reward card can be drawn having a victory point value. A player wins the game by having a victory point total equal to or exceeding a victory point threshold.

20 Claims, 13 Drawing Sheets

100

100

<u>800</u>

900

Play first suit cards — 902

Effectuate first suit card effects — 904

Play second suit cards — 906

Effectuate second suit card effects — 908

Play reward card — 910

Effectuate main character effect — 912

Determine total suit value for each player — 914

Determine trick phase winner — 916

Collect trick phase cards — 918

1000

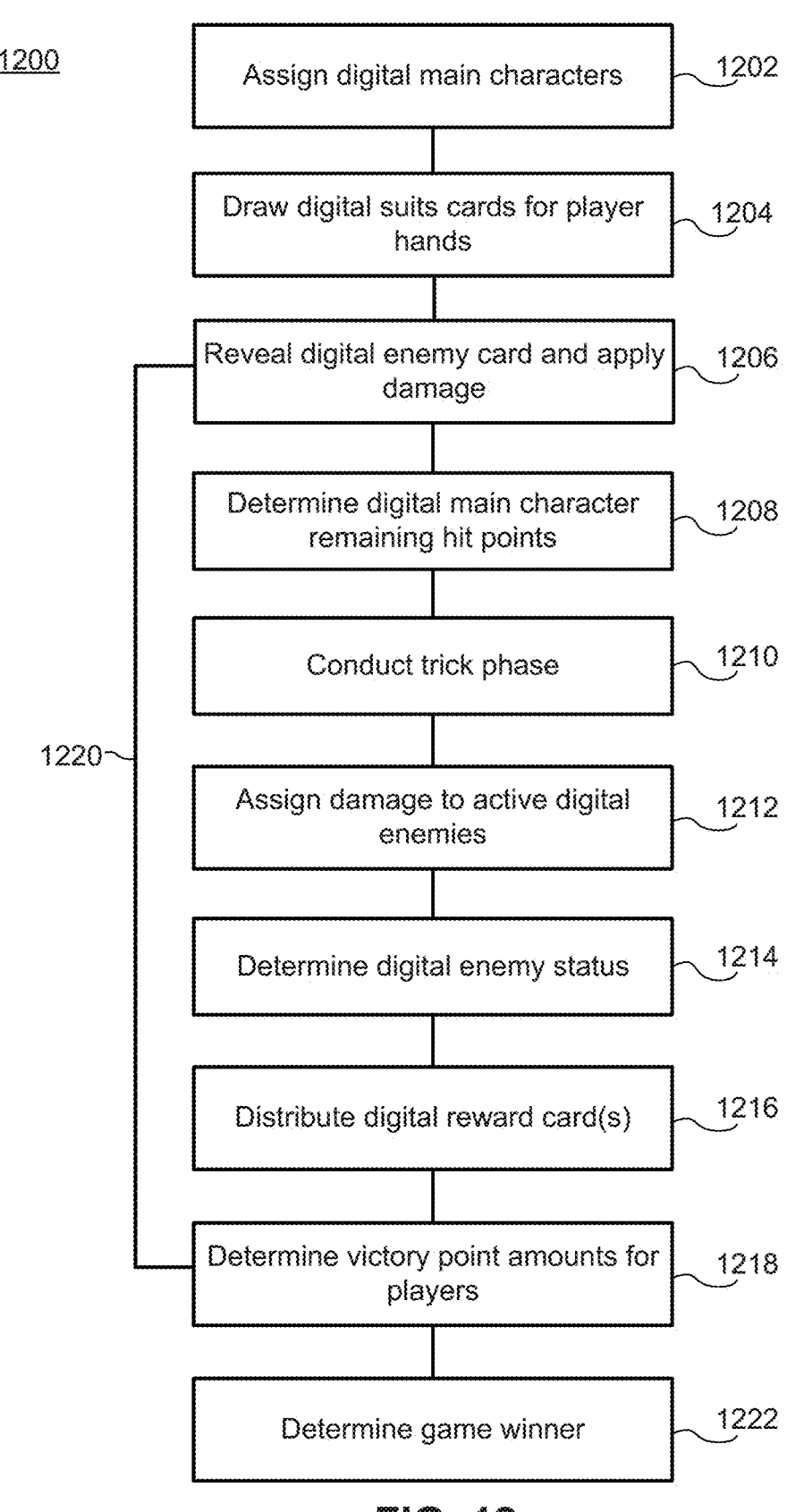

1200

Assign digital main characters —1202

Draw digital suits cards for player hands —1204

Reveal digital enemy card and apply damage —1206

Determine digital main character remaining hit points —1208

Conduct trick phase —1210

1220—

Assign damage to active digital enemies —1212

Determine digital enemy status —1214

Distribute digital reward card(s) —1216

Determine victory point amounts for players —1218

Determine game winner —1222

Play first digital suit cards ~1302

Effectuate first suit card effects ~1304

Play second digital suit cards ~1306

Effectuate second suit card effects ~1308

Play digital reward card ~1310

Effectuate main character effect ~1312

Determine total suit value for each player ~1314

Determine trick phase winner ~1316

Assign digital trick phase cards to trick phase winner ~1318

GAME SYSTEMS AND METHODS

CROSS-REFERENCE TO RELATED APPLICATIONS

This application is a nonprovisional of, and claims priority to and the benefit of, U.S. Provisional Patent Application No. 63/454,805, filed Mar. 27, 2023 and entitled "GAME SYSTEMS AND METHODS," which is hereby incorporated by reference herein.

FIELD

The present disclosure relates generally to game systems and methods.

BACKGROUND

It is a popular entertainment activity for individuals to play organized, instruction-based games, particularly games involving strategy, interacting and inter-related components, characters, and the like. There are, therefore, a wide variety of games employing various modes of play, components (e.g., cards, dice, game surfaces and boards, etc.), and degrees of strategy. Characters and other components of a game system can also be enjoyable for collecting purposes, with cards and other components having varying aesthetic components and degrees of rarity or desirability.

SUMMARY

In various examples, a game system can comprise an original deck of cards and/or a game surface. The original deck of cards can comprise one or more sub-decks, such as a suit card deck, an enemy card deck, a reward card deck, and/or a main character deck. The suit card deck can comprise suit cards, for example, 50 to 70 suit cards. Each suit card can comprise a card suit, a card type, a suit card effect, and/or a suit value. The suit card deck can comprise at least three card suits and at least three card types. A suit card effect can affect hit points of a main character card, cards played or added during a trick phase of the game, hit points of an enemy card, and/or a number of cards in a player's hand. An enemy card deck can comprise enemy cards, for example, 20 to 30 enemy cards. Each enemy card can comprise an enemy hit point value, an enemy damage effect, an enemy rating, and/or an enemy block type. A reward card deck can comprise reward cards, for example, 20 to 30 reward cards. Each reward card can comprise a reward card effect, a reward rating, and/or a reward victory point value. A reward card effect can affect hit points of a main character, cards played or added during a trick phase, damage to an enemy card, and/or a number of cards in a player's hand. A main character deck can comprise one or more main character cards. Each main character card can comprise a character hit point value and/or a main character effect.

In various examples, a method of gameplay can comprise providing an original card deck comprising a suit card deck, an enemy card deck, a reward card deck, and/or a main character card deck. The method can further comprise a first player drawing a number of player suit cards from the suit card deck to create a player hand; and/or a second player (an opponent of the first player) drawing a number of opponent suit cards from the suit card deck to create an opponent hand. The method can further comprise selecting, by a first player, a player main character card from the main character deck, wherein the player main character card comprises a player hit point value and a player main character effect; selecting, by the opponent, an opponent main character card from the main character deck, wherein the opponent main character card comprises an opponent hit point value and an opponent main character effect; and/or conducting a first trick phase. At least one active enemy card from the enemy card deck can be disposed faceup on the game surface. In various examples, an enemy card from the enemy card deck can be revealed before conducting the first trick phase, which can become an active enemy card.

In various examples, conducting the first trick phase can comprise the first player playing a first player suit card faceup from the player hand comprising a first chosen suit, a first player suit card effect, and a first player suit value; effectuating the first player suit card effect of the first player suit card; the opponent playing a first opponent suit card faceup from the opponent hand comprising the first chosen suit, a first opponent suit card effect, and a first opponent suit value; effectuating the first opponent suit card effect of the first opponent suit card; the opponent playing a second opponent suit card faceup from the opponent hand comprising a second chosen suit, a second opponent suit card effect, and a second opponent suit value; effectuating the second opponent suit card effect of the second opponent suit card; the first player playing a second player suit card faceup from the player hand comprising the second chosen suit, a second player suit card effect, and a second player suit value, wherein the first player suit card, the second player suit card, the first opponent suit card, and the second opponent suit card are trick cards; effectuating the second player suit card effect of the second player suit card; determining a player total suit value, which is a total of the first player suit value and the second player suit value; determining an opponent total suit value, which is a total of the first opponent suit value and the second opponent suit value; and/or comparing the player total suit value and the opponent total suit value to determine a trick phase winner of the trick phase. The trick phase winner can collect the trick cards from the trick phase. The first trick phase can further comprise determining a player rank in response to the comparing the player total suit value and the opponent total suit value, wherein the trick phase winner can be the first ranked player. In various examples, effectuating a suit card effect can comprise the respective player adding another suit card facedown to the faceup suit card, and the suit value of the added suit card can be included in determining the respective player's total suit value. In various examples, effectuating a suit card effect can comprise adding a healing number of hit points to the remaining hit points of the respective player's main character. In various examples, the first trick phase can comprise a player playing a reward card; and effectuating the reward card effect of the played reward card.

In various examples, the method can further comprise the trick phase winner assigning each trick phase card to a desired active enemy card of active enemy card(s) as a damage card to the desired active enemy card; determining a remaining hit point level of the desired active enemy card based on the enemy hit point value of the desired active enemy and the trick cards assigned to the desired active enemy; and/or in response to the remaining enemy hit point level of the desired active enemy card being zero (i.e., the enemy being defeated), drawing, by the trick phase winner, a reward card from the reward card deck. The drawn reward card can comprise a reward rating that is equal to an enemy rating of the defeated enemy card. In response to the drawing a reward card, the method can further comprise determining a player victory point amount for the trick phase winner including the reward victory point value of the drawn reward card; and/or in response to the player victory point amount equaling or exceeding a victory point threshold, determining the trick phase winner to be a winner of the game.

In various examples, the method can further comprise, before conducting the first trick phase, applying damage to the player main character card and/or the opponent main character card for the enemy damage effect of each active enemy card; and/or in response, determining remaining hit points of the player hit point value for the player main character card and remaining hit points of the opponent hit point value for the opponent main character card. Before applying damage from enemy cards, the method can further comprise a player discarding an un-played suit card from their hand having a card type that matches the enemy block type of an active enemy card, which can prevent damage being applied from the respective enemy card to the respective player's main character. In various examples, there can be a plurality of active enemy cards, wherein assigning each trick card to a desired active enemy card comprises assigning, by the trick phase winner, at least one of the trick cards to each of at least two of the plurality of active enemy cards. The method can further comprise determining remaining hit point levels of the at least two of the plurality of active enemy cards based on each of the enemy hit point values of the active enemy cards and the number of trick cards assigned to the active enemy cards; and/or in response to the remaining hit point levels of the at least two of the plurality of active enemy cards being zero, the at least two of the plurality of active enemy cards can be defeated enemy cards. Accordingly, drawing a reward card can comprise drawing a reward card from the reward deck for each of the defeated enemy cards. The method can further comprise the first ranked player from the first trick phase selecting a first of the drawn reward cards; and/or the second ranked player selecting a second of the drawn reward cards.

A system, method, and article of manufacture (collectively, "the system") are disclosed relating to game systems and methods. In various examples, the system can be configured to perform operations including displaying, by the processor, a player digital main character card on a graphical user interface (GUI), wherein the player digital main character card comprises a player hit point value and/or a player main character effect; displaying, by the processor, an opponent digital main character card on the GUI, wherein the opponent digital main character card comprises an opponent hit point value and/or an opponent main character effect; presenting, by the processor, at least one active digital enemy card faceup on the GUI comprising a first enemy hit point value, a first enemy damage effect, a first enemy rating, and/or a first enemy block type; and/or conducting a first trick phase.

Conducting a first trick phase can comprise receiving, by the processor, a selection of a first player digital suit card from a player digital hand comprising a first chosen suit, a first player suit card effect, and/or a first player suit value; presenting, by the processor, the selected first player digital suit card faceup on the GUI separate from the player digital hand; effectuating, by the processor, the first player suit card effect of the first player digital suit card; receiving, by the processor, a selection of a first opponent digital suit card from an opponent digital hand comprising the first chosen suit, a first opponent suit card effect, and/or a first opponent suit value; presenting, by the processor, the selected first opponent digital suit card faceup on the GUI separate from the opponent digital hand; effectuating, by the processor, the first opponent suit card effect of the first opponent digital suit card; receiving, by the processor, a selection of a second opponent digital suit card from the opponent digital hand comprising a second chosen suit, a second opponent suit card effect, and/or a second opponent suit value; presenting, by the processor, the selected second opponent digital suit card faceup on the GUI separate from the opponent digital hand; effectuating, by the processor, the second opponent suit card effect of the second opponent digital suit card; receiving, by the processor, a selection of a second player digital suit card from the player digital hand comprising the second chosen suit, a second player suit card effect, and/or a second player suit value, wherein the first player digital suit card, the second player digital suit card, the first opponent digital suit card, and the second opponent digital suit cards are digital trick cards; presenting, by the processor, the selected second player digital suit card faceup on the GUI separate from the player digital hand; effectuating, by the processor, the second player suit card effect of the second player digital suit card; determining, by the processor, a player total suit value, which is the total of the first player suit value and the second player suit value; determining, by the processor, an opponent total suit value, which is the total of the first opponent suit value and the second opponent suit value; comparing, by the processor, the player total suit value and the opponent total suit value; determining, by the processor, a trick phase winner of the trick phase based on the comparing the player total suit value and the opponent total suit value; and/or assigning, by the processor, the digital trick cards to the trick phase winner.

In various examples, the operations can further comprise receiving, by the processor, an assignment selection from the trick phase winner comprising an active digital enemy card to which to assign each of the digital trick cards; assigning, by the processor, each of the digital trick cards to the selected active digital enemy card; determining, by the processor, a remaining hit point level of the desired active digital enemy card based on the enemy hit point value of the desired active digital enemy card and the number of digital trick cards assigned to the desired active digital enemy card; in response to the remaining hit point level of the desired active digital enemy card being zero (i.e., the digital enemy being defeated), drawing, by the processor and a random number generator, a digital reward card from a digital reward card deck; and/or assigning, by the processor, the drawn digital reward card to the trick phase winner.

A digital reward card deck can comprise digital reward cards, for example, 20 to 30 digital reward cards. Each digital reward card can comprise a reward card effect, a reward rating, and/or a reward victory point value. A reward card effect can affect the hit points of a digital main character, digital cards played or added during a trick phase, damage to a digital enemy card, and/or a number of digital cards in a player's hand.

In various examples, the operations can further comprise assigning, by the processor, a first reward victory point value of the drawn digital reward card to the trick phase winner in response the assigning the digital reward card; determining, by the processor, a player victory point amount for the trick phase winner in response to assigning the first reward victory point value to the trick phase winner; comparing, by the processor, the player victory point amount to a victory point threshold; and/or determining, by the processor, the trick phase winner to be a winner of the game in response to the player victory point amount equaling or exceeding the victory point threshold. In various examples, the operations can further comprise determining, by the processor, an enemy rating associated with the desired active digital enemy card, wherein the reward rating of the drawn digital reward card is equal to the enemy rating.

In various examples, the operations can further comprise, before conducting the first trick phase, drawing, by the processor and the random number generator, a number of player digital suit cards from a digital suit card deck to create the player digital hand; and/or drawing, by the processor and the random number generator, a number of opponent digital suit cards from the digital suit card deck to create the opponent digital hand. A digital suit card deck can comprise digital suit cards, for example between 50 and 70 digital suit cards, each having a card suit, a card type, a suit card effect, and/or a suit value. There can be at least three card suits and at least three card types in the digital suit card deck. A suit card effect can affect the hit points of a digital main character card, digital cards played or added during a trick phase, damage to a digital enemy card, and/or a number of digital cards in a player's hand.

In various examples, the operations can further comprise drawing, by the processor and the random number generator, at least one digital enemy card from a digital enemy card deck; and/or applying, by the processor, damage to the player digital main character card and/or the opponent digital main character card for the enemy damage effect of each active digital enemy card (there can be one or more active digital enemy cards). A digital enemy card deck can comprise digital enemy cards, for example 20 to 30 digital enemy cards. Each digital enemy card can comprise an enemy hit point value, an enemy damage effect, an enemy rating, and/or an enemy block type. In various examples, the operations can further comprise receiving, by the processor, selection of an un-played digital suit card from a player's digital hand having a card type that matches an enemy block type of an active digital enemy card; applying, by the processor, damage to digital main character cards for the enemy damage effect of the active enemy cards other than the digital main character card associated with the un-played suit card having a card type matching the respective enemy block type. The operations can further comprise discarding, by the processor, the un-played suit card from the player digital hand; and/or in response, determining, by the processor, remaining hit points of the hit point values for the digital main character cards to which enemy damage was applied.

BRIEF DESCRIPTION OF THE DRAWINGS

The subject matter of the present disclosure is particularly pointed out and distinctly claimed in the concluding portion of the specification. A more complete understanding of the present disclosure, however, can best be obtained by referring to the detailed description and claims when considered in connection with the drawing figures. In the figures, like referenced numerals can refer to like parts throughout the different figures unless otherwise specified.

FIG. 12 illustrates a flowchart of an exemplary method for playing a digital game system, in accordance with various examples.

DETAILED DESCRIPTION

The detailed description of various examples herein makes reference to the accompanying drawings, which show the various examples by way of illustration. While these various examples are described in sufficient detail to enable those skilled in the art to practice the disclosure, it should be understood that other examples can be realized and that logical, electronic, compositional, and mechanical changes can be made without departing from the spirit and scope of the disclosure. Thus, the detailed description herein is presented for purposes of illustration only and not of limitation. For example, the steps recited in any of the method or process descriptions can be executed in any combination or order and are not limited to the combination and order presented. Moreover, any of the functions or steps can comprise intervening steps therebetween and/or can be outsourced to or performed by one or more third parties. Furthermore, any reference to singular includes plural examples, and any reference to more than one component or step can include a singular component or step. Denotations such as "first," "second," and/or the like do not necessarily or directly indicate a certain order or sequence, but can function as identifiers to identify discrete aspects, and/or associate certain aspects, of a system or method, as dictated by the context in which such denotations are used. Any reference to attached, fixed, connected, or the like can include permanent, removable, temporary, partial, full, and/or any other possible attachment option.

Figure 1:
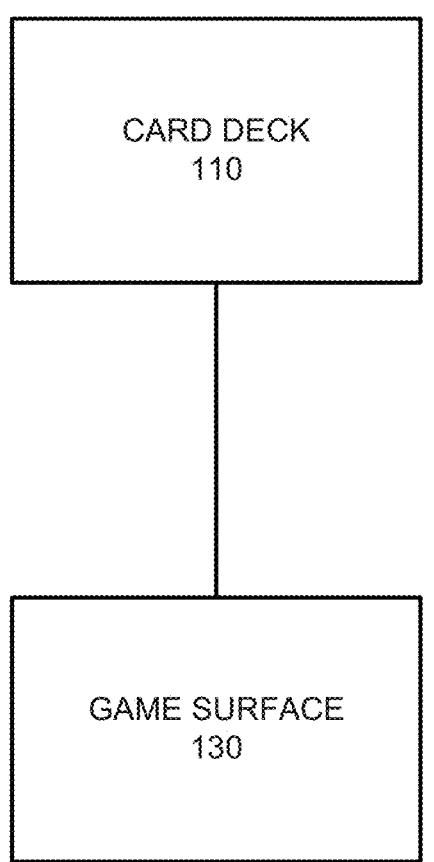
FIG. 1 illustrates a schematic diagram of a game system, in accordance with various examples.

With reference to FIG. 1, a block diagram of an exemplary game system 100 is depicted, in accordance with various examples. In various embodiments, game system 100 can comprise a card deck 110 and/or a game board or surface 130. The components of game system 100 (e.g., various card types within card deck 110) can interact with one another to determine game actions, scoring, and/or the like. For example, cards in card deck 110, and/or information or images displayed thereon, can dictate related cards to play, actions to take, damage to apply or remove from a character (e.g., main characters or enemies, discussed further herein) in the game, and/or spaces on a game surface 130 upon which to take certain actions within a game.

Figure 3:
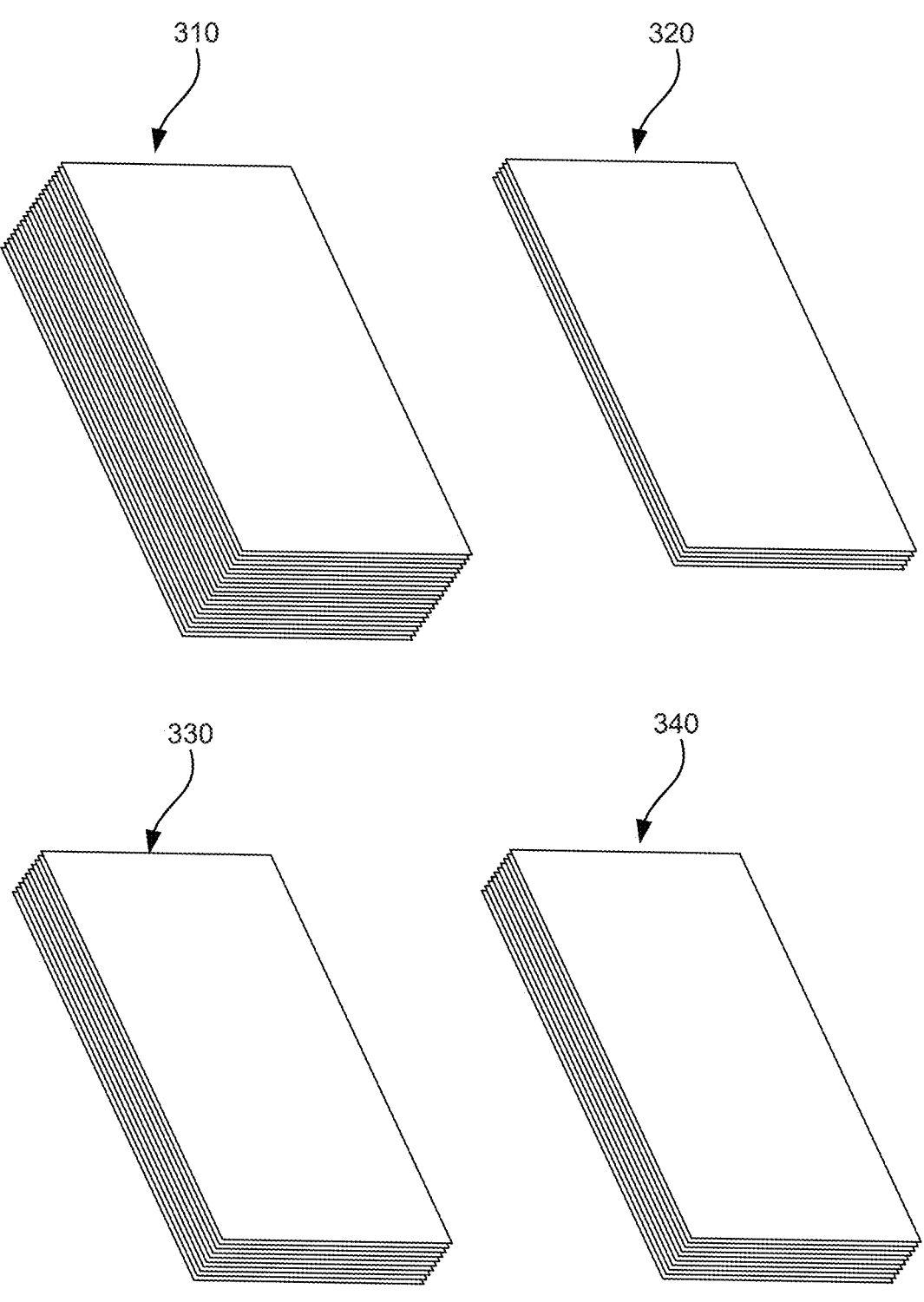
FIG. 3 illustrates an original deck(s) of card, in accordance with various examples.

In various examples, card deck 110 can comprise an original card deck having various card types. With additional reference to FIG. 3, a card deck for game system 100 can comprise one or more original sub-decks of cards (each sub-deck may also be referred to as a "deck" herein). For example, a card deck 110 for game system 100 can comprise a suit card deck 310, a main character deck 320, an enemy card deck 330, and/or a reward card deck 340. Cards in the original card deck can comprise any suitable shape (e.g., rectangular, square, oval, and/or the like) and any suitable material (e.g., the cards can be made of paper, cardboard, a polymeric material (e.g., a plastic), a ceramic, a metallic material, and/or the like).

In various examples, a main character deck 320 can comprise one or more main character cards. For example, main character deck 320 can comprise 1-10 main character cards, 2-7 main character cards, 4-6 main character cards, at least 3 main character cards, or about 3, 4, 5, or 6 main character cards (in this context, "about" means plus or minus two cards). Each main character card in main character deck 320 can comprise a character (e.g., a picture and/or title thereof) and/or various characteristics or statistics of the respective main character. For example, each main character can have a hit point value and/or a main character effect. The main character deck can be disposed facedown on the game surface such that none of the players can see which cards are in the main character deck. Main character cards can be revealed in response to a player drawing a main character card to use as the player's main character.

Figures 4A, 4B:
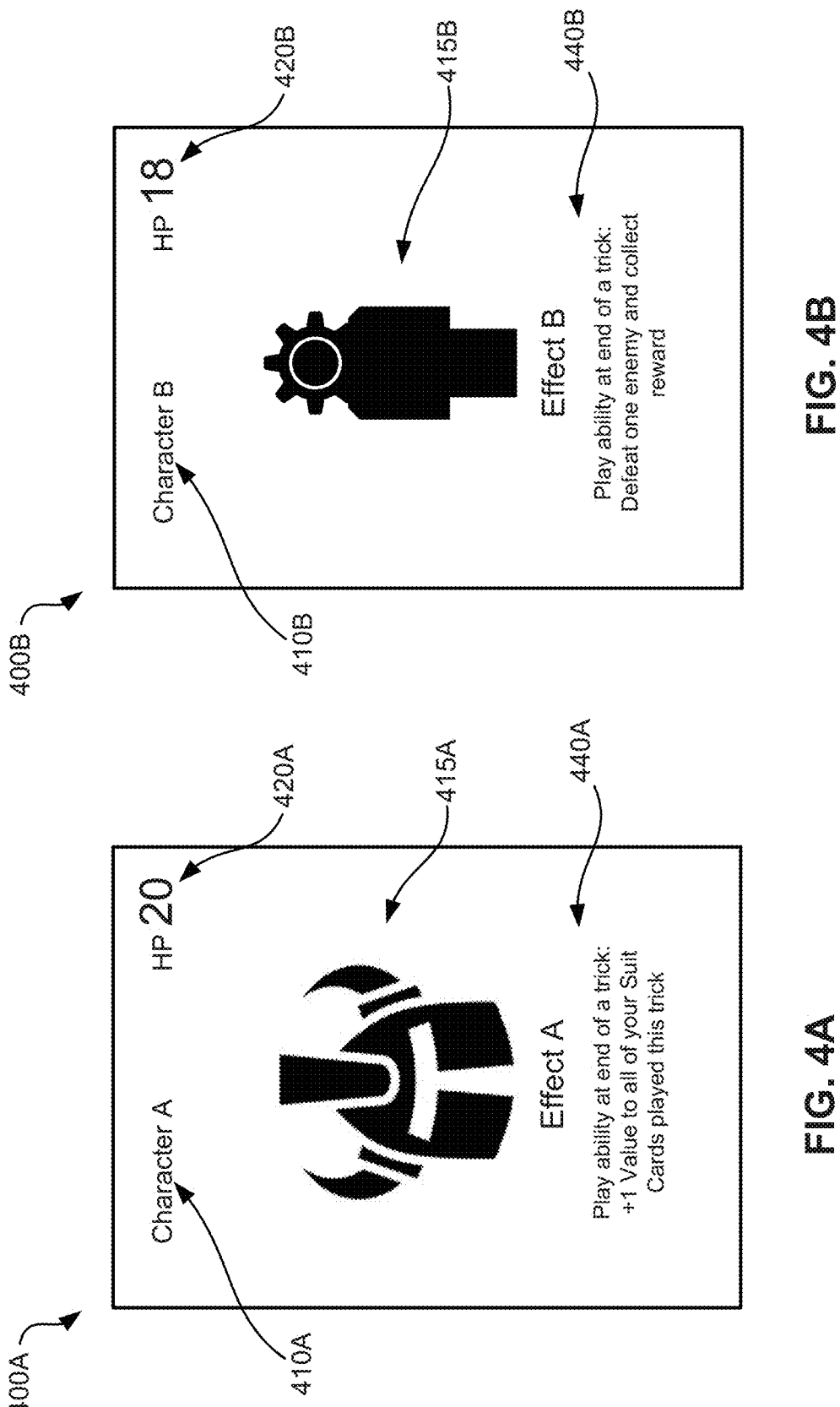
FIGS. 4A and 4B illustrate exemplary main character cards for inclusion in an original deck of cards for a game, in accordance with various examples.

With additional reference to FIGS. 4A and 4B, main character cards 400A and 400B are examples of main character cards included in main character deck 320. Main character card 400A can comprise the character title or name 410A and/or character image 415A to identify the associated character. Main character card 400A can comprise hit point value 420A, wherein hit points are a unit of damage representing the amount of damage the associated character (e.g., a main character or enemy, discussed further herein) can tolerate or withstand before being defeated. Main character card 400A can comprise a character effect 440A. Similarly, main character card 400B can comprise the character title or name 410B and/or character image 415B, hit point value 420B, and/or a character effect 440B. A main character effect can have an effect on a player or opponent's main character, or on an enemy card, such as its hit points (e.g., increasing or decreasing, i.e., healing or damaging, respectively), and/ or have an effect on a player's play or turn, or on the trick phase of the game (discussed further herein), such as the number of cards in the player's or an opponent's hand (e.g., instructing drawing or discarding a certain number of cards), cards played during a trick phase of the game (e.g., allowing a player to play additional suit cards), and/or any other desired action.

For example, main character card 400A can comprise a character effect 440A instructing the addition of plus-one (+1) suit value to each suit card played during a trick phase for the respective player. As another example, main character card 400B can comprise a character effect 440B instructing the defeat of one enemy card and collecting the reward card resulting therefrom. In various examples, a main character card can utilize the associated character effect at any suitable time or with any suitable frequency. For example, a main character effect can occur periodically (e.g., every round or trick phase), or once any only once. A main character effect can be utilized or effected at the end of a round or trick phase, during a player's turn to play a suit card during a trick phase, or at any other suitable time. The timing of a main character effect can be instructed on the respective main character card. For example, character effects 440A,B of main character cards 400A,B instruct the timing of use of the character to be at the end of a trick phase.

In response to a main character effect being used, the main character can be exhausted, meaning that the main character effect can no longer be used or cannot be used again until a certain event occurs (a main character running out of remaining hit points and being revived, as discussed herein). In response to a main character's effect being used, or the main character being exhausted, the main character card can be placed in a position or orientation to indicate exhaustion, such as horizontally or at an angle (e.g., a nonparallel, nonorthogonal angle) relative to an edge of the game surface (e.g., the game surface edge proximate to the respective player), facedown, and/or the like.

The statistics or other information of a main character can be disposed in any suitable location on the main character card. As shown on main character cards 400A,B, character names and/or hit point values can be disposed proximate and/or adjacent to a top edge of the respective main character card. The character effects 440A,B can be disposed proximate a bottom edge of the main character cards. A character image or symbol 415A,B can be disposed approximately in the middle of a main character card (e.g., between the character title/name and the character effect). As used herein, "main character" can refer to the main character and/or the respective main character card.

In various examples, suit card deck 310 can comprise suit cards that can be played at various times during a game or trick phase, and can be used to determine outcomes of trick phases, actions to take, and/or the like. In various examples, suit card deck 310 can comprise 30-80 cards, 40-75 cards, 50-70 cards, about 30 cards, about 40 cards, about 50 cards, or about 60 cards, or about 68 cards (in this context, "about" means plus or minus five cards). Suit card deck 310 can comprise various types of suit cards. In various examples, each suit card in suit card deck 310 can comprise a card suit, a card type, a suit card effect, and/or a suit value. The suit card deck can be disposed facedown on the game surface such that none of the players can see which cards are in the suit card deck. Suit cards can be revealed to a respective player in response to suit cards being drawn into the player's hand. Suit cards can be revealed to all players in response to a respective player playing the suit card and/or to determine a total suit value during a trick phase (e.g., adding up the suit values of all played and added suit cards during a trick phase).

Figures 7A, 7B, 7C:
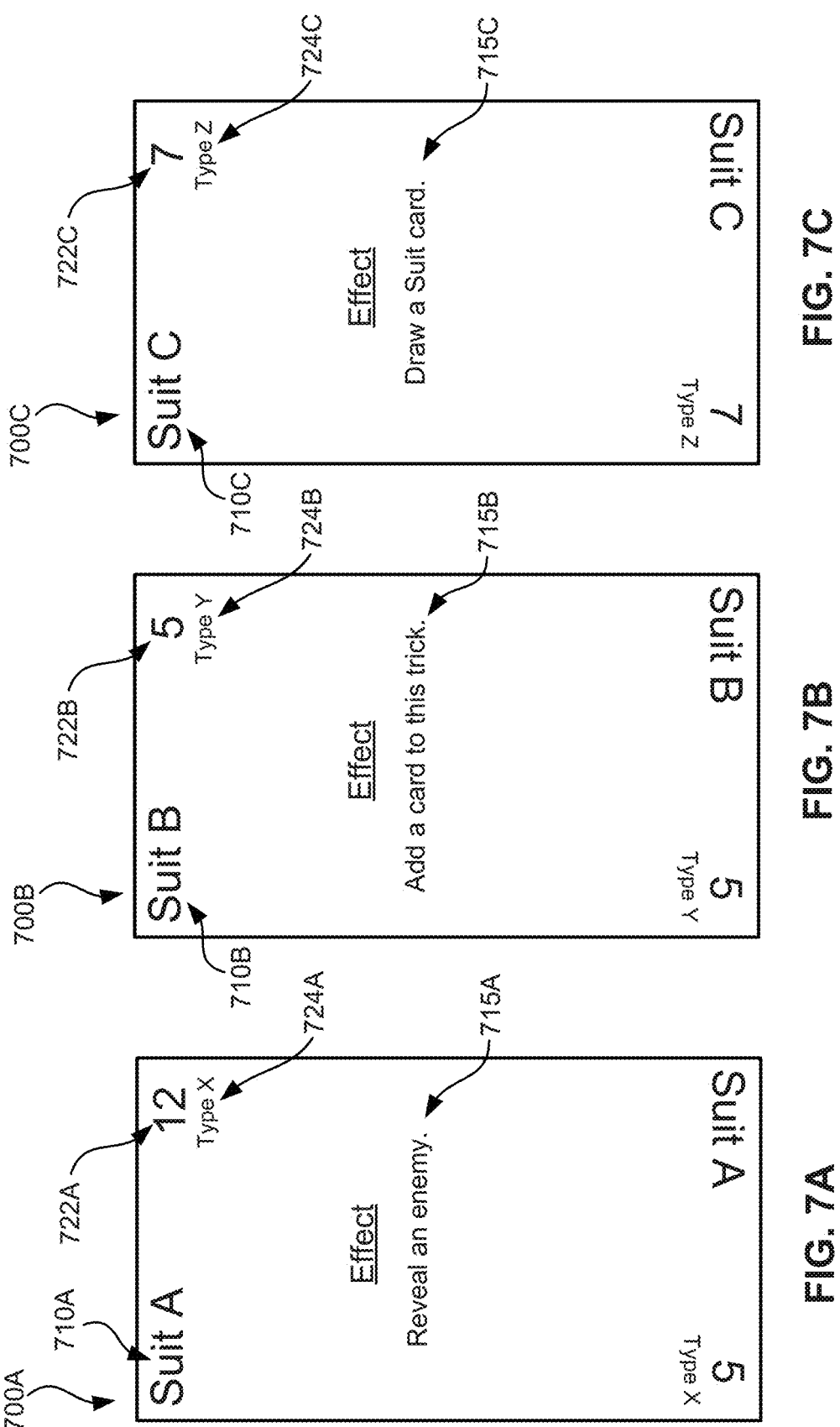
FIGS. 7A-7C illustrate exemplary suit cards for inclusion in an original deck of cards for a game, in accordance with various examples.

In various examples, with additional reference to FIGS. 7A-7C, suit card deck 310 can comprise at least three card suits. That is, within a suit card deck 310, a first number of suit cards can comprise a first suit, a second number of suit cards can comprise a second suit, and a third number of suit cards can comprise a third suit, etc. Additional portions of suit card deck 310 can comprise additional suits. For example, suit card 700A comprises Suit A 710A, suit card 700B comprises Suit B 710B, and suit card 700C comprises Suit C 710C. Each suit can be a letter (as shown in suit cards 700A-700C), a number, a symbol or image, and/or any other suitable indicator. The portions of suit cards comprised in suit card deck 310 allocated to or comprising each suit can be equal or as close to equal as possible (e.g., for a suit card deck 310 comprising 68 suit cards and three card suits, a first portion of 23 suit cards can comprise a first suit, a second portion of 23 suit cards can comprise a second suit, and a third portion of 22 suit cards can comprise a third suit). In various examples, the number of suit cards in a suit card deck 310 comprising each card suit can be any suitable number.

In various examples, the suit value of each suit card in suit card deck 310 can be a numerical value, or any other indicator of value (e.g., a number of symbols, size of symbols, and/or the like) that can be added with, or ranked with respect to, other suit cards and their respective suit values. For example, suit card 700A comprises a suit value 722A, suit card 700B comprises suit value 722B, and suit card 700C comprises suit value 722C. In various examples, the suit values of played suit cards can be a part of determining the winner and/or rank of a player at the conclusion of a round or trick phase of a game.

In various examples, the card types of suit cards in suit card deck 310 can indicate a card type, which can allow playing of the respective suit cards in response to another component of the game in play during a round or trick phase. For example, suit card 700A comprises a card type 724A, suit card 700B comprises card type 724B, and suit card 700C comprises card type 724C. Each card type can be a letter (as shown in suit cards 700A-700C), a number, a symbol or image, and/or any other suitable indicator. In various examples, an enemy card can deal damage to the players' main characters, but an enemy card can comprise a block type. The block type indicates the card type of a suit card that can be played by a player to block the damage dealt from the respective enemy card from affecting the player's main character.

In various examples, each suit card can comprise a suit card effect. A suit card effect can have an effect on a player or opponent's main character, or on an enemy card, such as its hit points (e.g., increasing or decreasing, i.e., healing or damaging, respectively), and/or have an effect on a player's play or turn, or on the trick phase of the game (discussed further herein), such as the number of cards in the player's or an opponent's hand (e.g., instructing drawing or discarding a certain number of cards), cards played during a trick phase of the game (e.g., allowing a player to play additional suit cards, revealing additional enemy cards, or the like), and/or any other desired action. The suit card effect for suit cards can be positive (e.g., helping one or more of the players) or negative (e.g., causing damage, or the potential for damage, to one or more of the players' main characters).

As an example of a negative suit card effect, suit card 700A can comprise suit card effect 715A instructing to reveal an enemy. Accordingly, in response to playing suit card 700A, an additional enemy card can be revealed (e.g., drawn) from the enemy card deck and disposed faceup on the game surface. Thus, the drawn enemy card can now be an active enemy card. Accordingly, suit card effect 715A of suit card 700A can be a negative suit card effect because active enemy cards deal damage to the players' main characters, and therefore the revealed enemy card has the potential to deal damage to the players' main characters. In various examples, a negative suit card effect can be comprised in a suit card having a relatively high suit value (e.g., a suit value of 10 or above). Thus, while a suit card having a relatively high suit value can help a player win a trick phase, the effect can harm the same player's main character (as well as the other players' main characters).

As an example of a positive suit card effect, suit card 700B can comprise suit card effect 715B instructing to add a card to this trick phase. Accordingly, in response to playing suit card 700B, the respective player can add a suit card to the trick to further boost the total suit value, which can determine the winner of a trick, or the ranking of the other players (e.g., second place, third place, etc.), as discussed further herein. Thus, suit card effect 715B of suit card 700B can be a positive suit card effect because suit card effect 715B helps the respective player. In various examples, a positive suit card effect can be comprised in a suit card having a relatively low suit value (e.g., a suit value of less than 10). Thus, while a suit card having a relatively low suit value can be of less help in a player trying to win a trick phase, the effect can help the same player. As another example of a positive suit card effect, suit card 700C can comprise suit card effect 715C instructing to draw a suit card. Accordingly, in response to playing suit card 700C, the respective player can draw a suit card from the suit card deck, which will be available for that player to play during the game.

A suit card effect can occur or be effectuated at any suitable time during a round trick phase or game, such as at the time the respective suit card is played, or a time instructed by the played suit card. In various examples, the suit card effect can occur one or more times, or once and only once.

In various examples, an enemy card deck 330 can comprise enemy cards, which deal damage to the main characters of each player periodically during a game (unless actions to block such damage are taken). For example, enemy card deck 330 can comprise 10-40 enemy cards, 15-35 enemy cards, 20-30 enemy cards, or about 23 or 25 enemy cards (in this context, "about" means plus or minus two cards). Each enemy card in enemy card deck 330 can comprise an enemy (e.g., an enemy character having a picture and/or title thereof) and/or various characteristics or statistics of the respective enemy. For example, each enemy can have an enemy hit point value, an enemy damage effect, an enemy rating, and/or an enemy block type. The enemy card deck can be disposed facedown on the game surface such that none of the players can see which cards are in the enemy card deck. Enemy cards can be revealed in response to being drawn from the enemy card deck, and such enemy cards become active enemy cards.

Figures 5, 6:
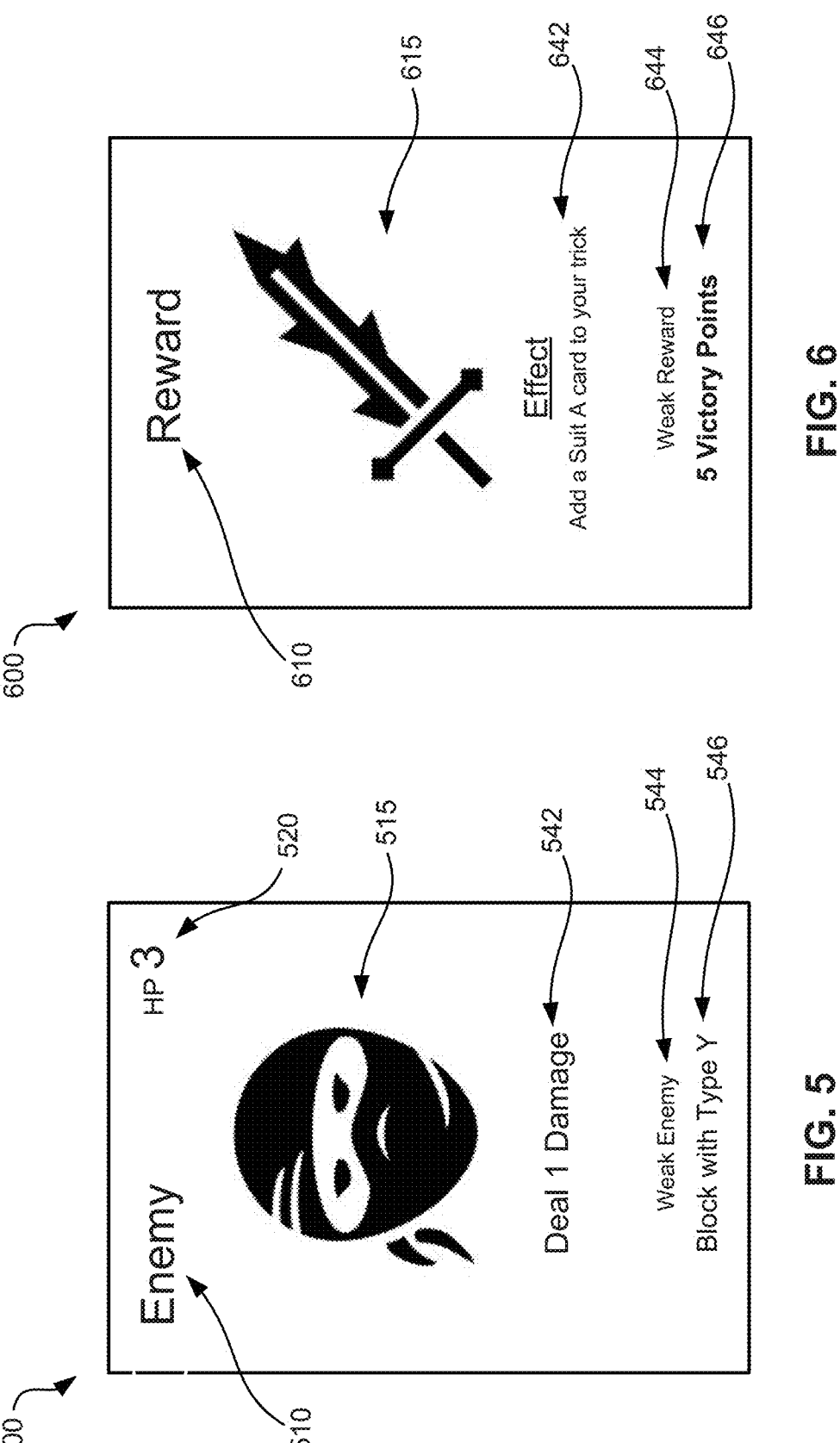
FIG. 5 illustrates an exemplary enemy card for inclusion in an original deck of cards for a game, in accordance with various examples.
FIG. 6 illustrates an exemplary reward card for inclusion in an original deck of cards for a game, in accordance with various examples.

With additional reference to FIG. 5, enemy card 500 is an example of enemy cards included in enemy card deck 330. Enemy card 500 can comprise the enemy title or name 510 and/or enemy image 515 to identify the associated enemy. Enemy card 500 can comprise enemy hit point value 520, indicating the amount of damage enemy card 500 can receive before being defeated. Enemy card 500 can comprise an enemy damage effect 542. An enemy damage effect can indicate how much damage an enemy can deal to each player's main character at the appropriate time in response to such enemy card being an active enemy card (e.g., dealing damage at the beginning of each round of a game in response to being an active enemy card). In various examples, an enemy damage effect can cause an additional enemy card to be revealed from the enemy card deck. Enemy card 500 can comprise an enemy rating 544. For example, enemy cards can comprise enemy ratings on a scale of three levels, e.g., weak, medium, and hard. Enemy card 500 comprises enemy rating 544 of a weak enemy. Enemy rating 544 can indicate a strength of the enemy, which can be related to the enemy hit point value. For example, an enemy card having a hard enemy rating can have an enemy hit point value greater than an enemy card having a medium enemy rating, which can have an enemy hit point value greater than an enemy card having a weak enemy rating. For example, an enemy card with a weak enemy rating can comprise an enemy hit point value of 1 to 3, an enemy card with a medium enemy rating can comprise an enemy hit point value of 4 to 6, and/or an enemy card with a hard enemy rating can comprise an enemy hit point value of over 6.

Enemy card 500 can comprise an enemy block type 546. An enemy block type can indicate a card type that can be played or used to block the damage dealt by an enemy card (e.g., at the beginning of a round or trick phase of a game). For example, enemy block type 546 of enemy card 500 indicates that a suit card having a card type Y (e.g., suit card 700B) can block damage dealt from enemy card 500. Accordingly, a player can player suit card 700B to block damage from enemy card 500. Playing such a suit card to block damage from an enemy card can cause such a block for one round or for the duration that such enemy card remains active (before it is defeated). In various examples, a suit card played to block damage from an enemy card can block the damage from one enemy card, or can block the damage from multiple active enemy cards (e.g., from all active enemy cards having the respective block type). In various examples, an enemy damage effect that causes an additional enemy card to be revealed from the enemy card deck cannot be blocked.

The statistics or other information of an enemy character can be disposed in any suitable location on the main character card. As shown on enemy card 500, enemy names and/or hit point values can be disposed proximate and/or adjacent to a top edge of the respective enemy card. The enemy damage effect 542 can be disposed more proximate a bottom edge than the top edge of the enemy card. An enemy image or symbol 515 can be disposed approximately in the middle of a main character card (e.g., between the enemy title/name and the enemy damage effect). Enemy block type 546 and/or enemy rating 544 can be disposed most proximate the bottom edge of the enemy card. As used herein, "enemy" can refer to an enemy and/or the respective enemy card.

An enemy card deck can comprise any suitable number of enemy cards having various enemy ratings. For example, an enemy card deck can comprise equal portions of enemy cards having each enemy rating, or the portions of enemy cards having each enemy rating can vary. For example, the portion of an enemy card deck comprising enemy cards having weak enemy ratings can be greater than each of the portions of the enemy card deck comprising enemy cards having medium and hard enemy ratings, and the portion of an enemy card deck comprising enemy cards having medium enemy ratings can be greater than the portion of the enemy card deck comprising enemy cards having hard enemy ratings. In various examples, an enemy card deck can comprise about nine enemy cards having a weak enemy rating, about eight enemy cards having a medium enemy rating, and about six enemy cards having a hard enemy rating (in this context, "about" means plus or minus two or three cards).

In various examples, a reward card deck 340 can comprise reward cards, which can be earned in response to defeating an enemy card, and/or can be played at various times during a game or trick phase to utilize an associated reward effect. For example, reward card deck 340 can comprise 10-40 reward cards, 15-35 reward cards, 20-30 reward cards, or about 23 or 25 reward cards (in this context, "about" means plus or minus two cards). Each reward card in reward card deck 340 can comprise a reward (e.g., having a picture and/or title thereof) and/or various characteristics or statistics of the respective reward. For example, each reward can comprise a reward card effect, a reward rating, and/or a reward victory point value.

With additional reference to FIG. 6, reward card 600 is an example of reward cards included in reward card deck 340. Reward card 600 can comprise the reward title or name 610 and/or reward image 615 to identify the associated reward. Reward card 600 can comprise various characteristics or statistics, such as reward card effect 642, reward rating 644, and/or reward victory point value 646.

In various examples, a reward card effect (e.g., reward card effect 642) can have an effect on a player or opponent's main character, or on an enemy card, such as its hit points (e.g., increasing or decreasing, i.e., healing or damaging, respectively), and/or have an effect on a player's play or turn, or on the trick phase of the game (discussed further herein), such as the number of cards in the player's or an opponent's hand (e.g., instructing drawing or discarding a certain number of suit cards), cards played during a trick phase of the game (e.g., allowing a player to play additional suit cards), and/or any other desired action. For example, reward card effect 642 instructs the respective player to add an additional suit card during the trick phase, wherein the suit value of the added suit card can be added to the total suit value for the player in determining which player wins the trick phase (discussed further herein).

In various examples, a reward card can be played and the reward card effect can be effectuated at any suitable time or with any suitable frequency. For example, a reward card effect can occur periodically (e.g., every round or trick phase), or once any only once. A reward card effect can be utilized or effected during or at the end of a round or trick phase, during a player's turn to play a suit card during a trick phase, or at any other suitable time. The timing of a reward card effect can be instructed on the respective reward card. In various examples, in response to a reward card effect being used, the reward card can be discarded, or for a reward card with a reward card effect that occurs periodically, the reward can be disposed on the game surface and remain active. In various examples, reward cards are disposed faceup on the game surface associated with the respective player. In response to a reward card effect being used, the reward card can remain active (e.g., faceup) for the associated reward victory point value, but the reward card effect may only be able to be used once. Therefore, after effectuation or use of the respective reward card effect, the reward card effect can be exhausted. In response, the respective reward card can be disposed in a position or orientation to indicate exhaustion, such as horizontally or at an angle (e.g., a nonparallel, nonorthogonal angle) relative to an edge of the game surface (e.g., the game surface edge proximate to the respective player), facedown, and/or the like.

In various examples, a reward rating, for example reward rating 644 of reward card 600, can indicate a level of benefit (e.g., via the respective reward card effect) a reward card may afford a player, and/or the associated reward victory point value. For example, reward cards can comprise reward ratings on a scale of three levels, e.g., weak, medium, and hard. Reward card 600 comprises reward rating 644 of a weak reward. In various examples, a reward card having a hard reward rating can have a reward victory point value greater than a reward card having a medium reward rating, which can have a reward victory point value greater than a reward card having a weak reward rating. For example, a reward card having a weak reward rating can comprise a reward victory point value of 1 to 5, a reward card having a medium reward rating can comprise a reward victory point value of 6 to 10, and/or a reward card having a hard reward rating can comprise a reward victory point value of over 10. In various examples, the reward card effect of a reward card having a hard reward rating may be more beneficial or stronger (e.g., dealing more damage to an enemy card, drawing, adding, or playing more suit cards, and/or the like) than a reward card having a medium reward rating, which can have a reward card effect that may be more beneficial or stronger than a reward card having a weak reward rating.

In various examples, reward card deck 340 can comprise reward cards having reward ratings corresponding or complementary to the enemy ratings of the enemy cards in enemy card deck 330. For example, in response to the enemy cards in enemy card deck 330 having enemy ratings on a scale of three levels, e.g., weak, medium, and hard, the reward cards comprised in reward card deck 340 can have corresponding or complementary reward ratings on a scale of three levels, e.g., weak, medium, and hard. Continuing with this example, during a game, reward card deck 340 can be divided into three reward card stacks based on the reward ratings. That is, all reward cards having a weak reward rating can be comprised in a weak reward card stack, all reward cards having a medium reward rating can be comprised in a medium reward card stack, and all reward cards having a hard reward rating can be comprised in a hard reward card stack. The reward card stacks can be disposed facedown so none of the players can see which reward cards are comprised in each. The reward cards can comprise a color, symbol, text, and/or other indicator (e.g., on the back of the reward cards) to indicate the reward level of the respective card. Thus, the reward cards can be divided into reward card stacks based on such reward rating indicators. In response to an enemy card being defeated, a reward card can be removed or drawn from the reward card stack that comprises a reward rating matching or equal to, or less than, the enemy rating of the defeated enemy. For example, in response to enemy card 500 being defeated, reward card 600 may be drawn from a weak-rating reward card stack because enemy card 500 comprises a weak enemy rating 544 and reward card 600 comprising weak reward rating 644.

A reward card deck can comprise any suitable number of reward cards having various reward ratings. For example, a reward card deck can comprise equal portions of reward cards having each reward rating, or the portions of reward cards having each reward rating can vary. For example, the portion of a reward card deck comprising reward cards having weak reward ratings can be greater than each of the portions of the reward card deck comprising reward cards having medium and hard reward ratings, and the portion of a reward card deck comprising reward cards having medium reward ratings can be greater than the portion of the reward card deck comprising reward cards having hard reward ratings. In various examples, a reward card deck can comprise about nine reward cards having a weak reward rating, about eight reward cards having a medium reward rating, and about six reward cards having a hard reward rating (in this context, "about" means plus or minus three cards). The reward card deck can comprise a number of reward cards having a weak reward rating equal to the number of enemy cards having a weak enemy rating, a number of reward cards having a medium reward rating equal to the number of enemy cards having a medium enemy rating, and/or a number of reward cards having a hard reward rating equal to the number of enemy cards having a hard enemy rating.

In various examples, a reward victory point value, for example reward victory point value 646 of reward card 600, can indicate a number of victory points received by the player holding the respective reward card. In order to win a game utilizing game system 100, a player can accumulate a victory point threshold number of victory points. Thus, the reward victory point value of each reward card a player possesses can count toward that player's victory point amount working toward the victory point threshold. A victory point threshold can be any suitable number (e.g., can be set by the players based on the desired duration of a game). In various examples, a victory point threshold can be dependent upon the number of players. The greater the number of players, the lesser the victory point threshold can be. For example, with two players, a victory point threshold can be about 60 victory points, with three players, a victory point threshold can be about 50 victory points, or with four players, a victory point threshold can be about 40 victory points (in this context, "about" means plus or minus five or ten victory points).

Figure 8:
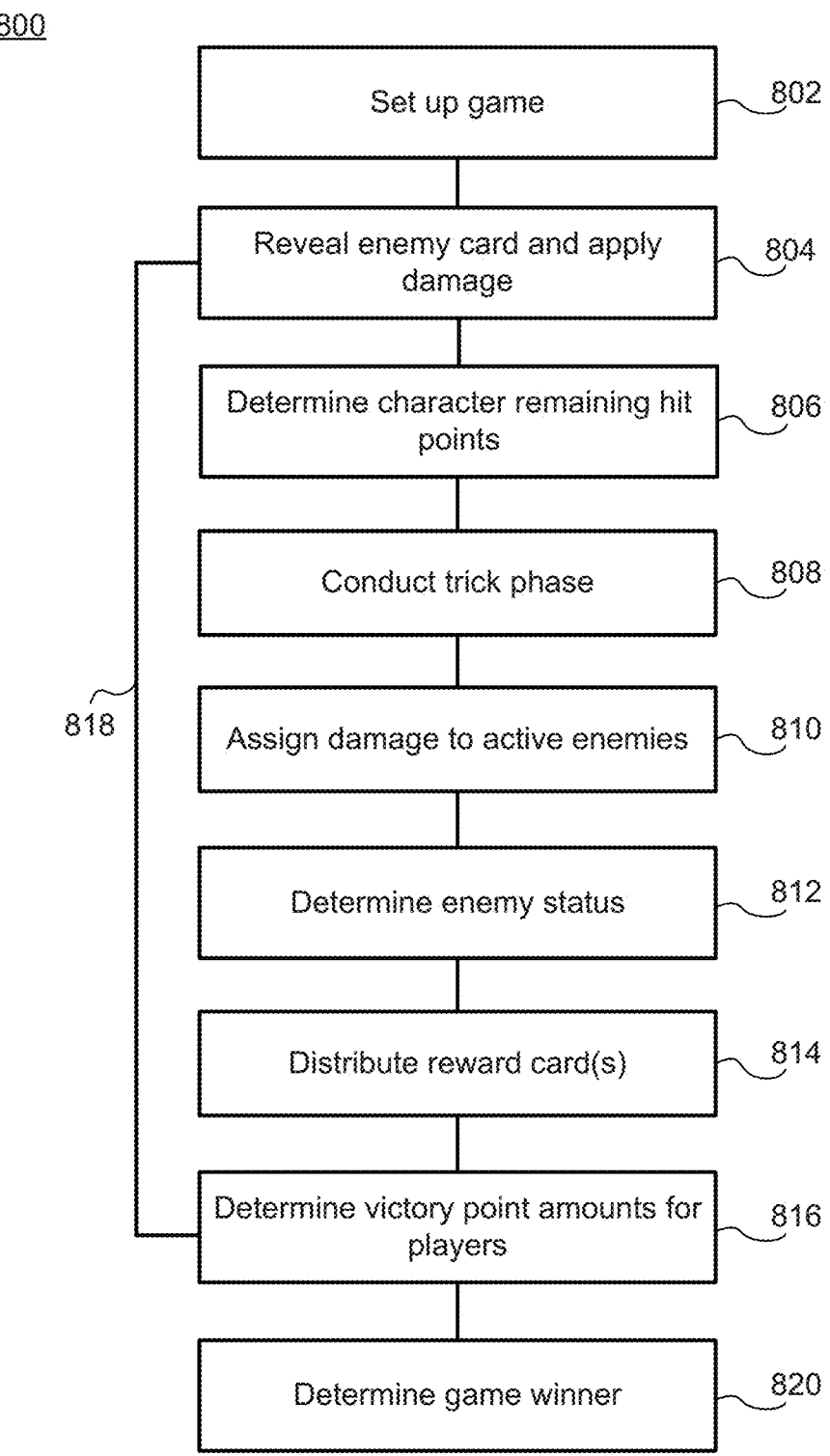
FIG. 8 illustrates a flowchart of an exemplary method for playing a game system, in accordance with various examples.

FIG. 8 illustrates a method 800 for playing a game (e.g., using game system 100 and its components), in accordance with various examples. Game system 100 can be for two or more players. For example, a game can involve a first player and a second player, wherein the second player is (and may be referred herein to as) the opponent to the first player.

A game utilizing game system 100 can comprise different components or steps/phases within a game. As used herein, a player's "turn" refers to the respective player being able to take actions, for example, by playing a suit card or reward card, or effecting the player's main character effect. A "round" can be a series of events that starts with a certain event and ends with determining the victory point amounts of each player. A round can be repeated during a game until a player is determined to be the winner. A "trick phase" occurs during a round during which each player plays one or more suit cards, and the winner of the trick phase receives the cards played during the respective trick phase (the "trick cards").

Figure 2A:
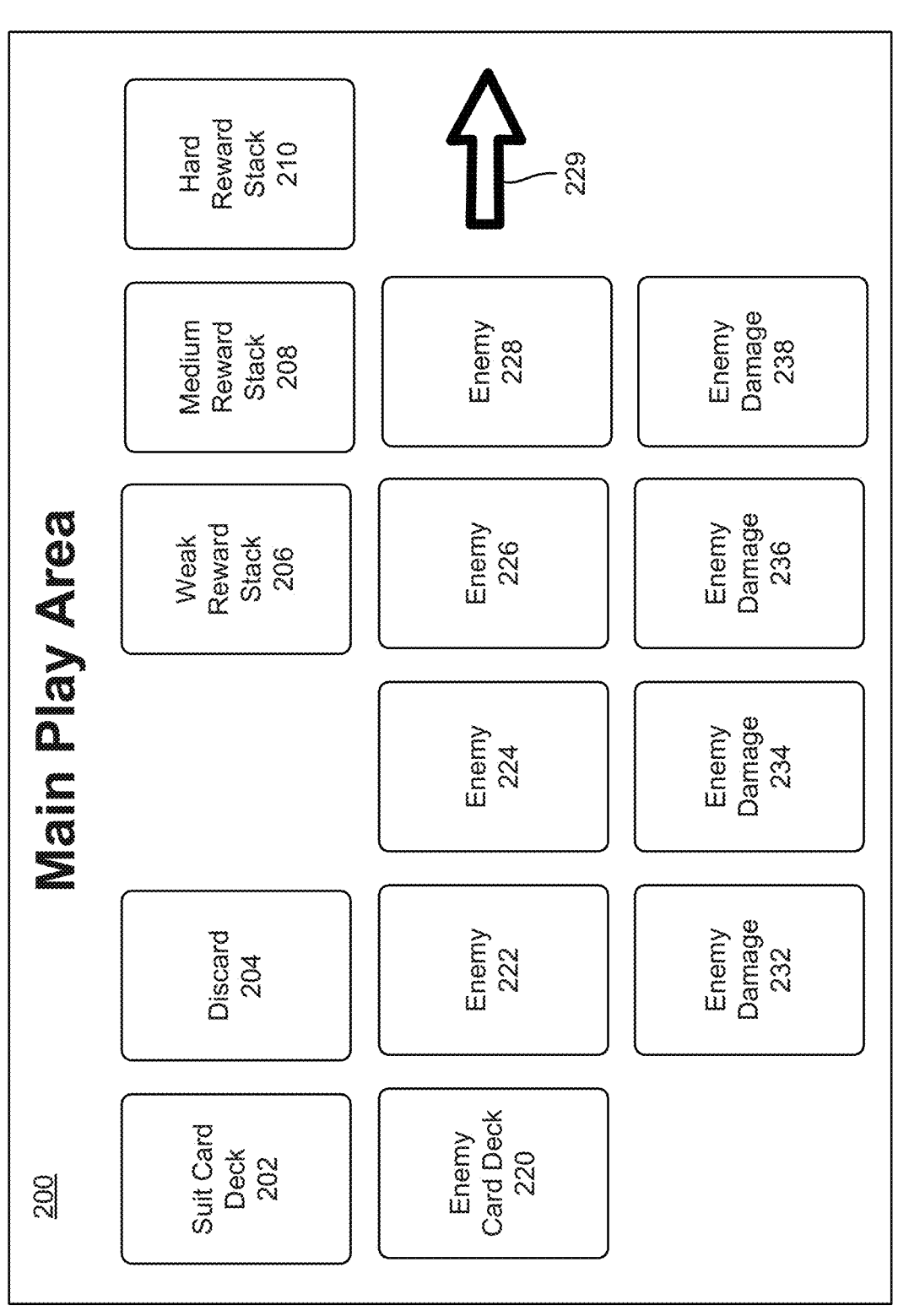
FIG. 2A illustrates a schematic diagram of a main play area of a game surface for a game system, in accordance with various examples.

In various examples, to play the game of game system 100, there may be one original card deck comprising a main character deck, a suit card deck, an enemy card deck, and/or a reward card deck, as discussed herein. The original card deck can be utilized by all players in a game (i.e., each player need not have their own card deck). Or, in various examples, each player can have their own original card deck. For purposes of discussing playing game system 100, the player and opponent will utilize one original card deck. With additional reference to FIG. 2A, game system 100 can be played on a game surface (e.g., game surface 200). A game surface for game system 100 can comprise any suitable arrangement of areas or components for cards, actions, and/or other aspects of the game. For example, a player utilizing game surface 200 can be positioned proximate any edge of game surface 200 (e.g., multiple players being positioned at various points around game surface 200).

Figure 2B:
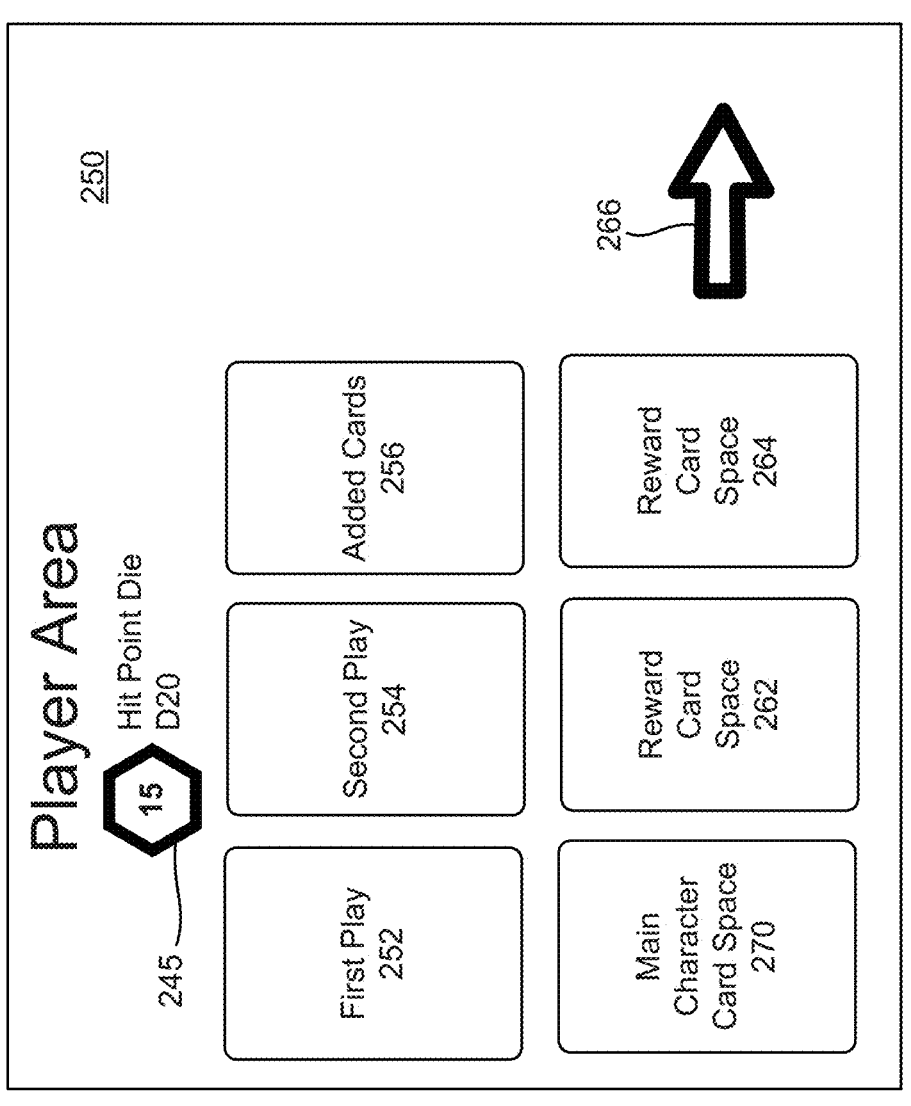
FIG. 2B illustrates a schematic diagram of a player area of a game surface for a game system, in accordance with various examples.

In various examples, with additional reference to FIG. 2B, each player can have a player area 250 onto which the respective player can play cards and display the associated main character card (in main character space 270) and/or any reward cards the player has received (in reward card spaces 262, 264) during the game.

To begin method 800 for playing a game, with additional reference to FIGS. 1-7, the game can be set up (step 802). The game set up can comprise separating original card deck 110 into suit card deck 310, main character card deck 320, enemy card deck 330, and/or reward card deck 340. Suit card deck 310 can be disposed facedown in suit card deck space 202 on game surface 200, and enemy card deck 330 can be disposed facedown in enemy card deck space 220 on game surface 200. Reward card deck 340 can be separated into multiple separate reward card stacks based on the reward rankings of the reward cards. For example, as discussed herein, reward card deck 340 can be divided into a weak reward stack comprising reward cards having a weak reward rating (being disposed facedown in weak reward stack space 206), a medium reward stack comprising reward cards having a medium reward rating (being disposed face-down in medium reward stack space 208), and a hard reward stack comprising reward cards having a hard reward rating (being disposed facedown in hard reward stack space 210). The card decks and stacks can be shuffled as appropriate.

In various examples, each player can select a main character card as part of the game setup. Such main char-acter selection can occur randomly (e.g., each player draws a main character card randomly from the main character card deck), or each player can select a desired main character card. In response to the players selecting their respective main character cards, the players can place their main character cards faceup on the game surface (e.g., in the respective main character card space 270 for each player).

As used herein, "facedown" means the aspects or infor-mation on the respective card is hidden from a respective player(s), and "faceup" means the aspects or information on the respective card is revealed to a respective player(s).

As another part of game set up, each player can draw a hand number of suit cards (e.g., about ten, wherein in this context, "about" plus or minus two or three cards) from suit card deck 310 to form their respective hand. For example, to start, the first player can have a hand having 10 suit cards that the first player can see but are hidden from the opponent, and likewise, the opponent can have a hand having 10 suit cards that the opponent can see but are hidden from the first player.

To begin the game and/or a round 818 of the game, an enemy card (one or more) from the facedown enemy card deck can be revealed (step 804). That is, each round, at least one enemy card can be revealed from the enemy card deck, thus adding to the number of active enemy cards. For an easy difficulty game, one enemy card can be revealed at the beginning of a round. For a hard difficult game, multiple enemy cards (e.g., two) can be revealed at the beginning of a round. The newly-revealed enemy card(s) can be disposed faceup on the top of the enemy card deck or directly adjacent to the enemy card deck. The position of the newly-revealed enemy card can indicate that that specific enemy card was revealed during the current round. Revealed enemy cards are active enemy cards, and active enemy cards apply damage to the players' main characters at the beginning of each round.

In various examples, during a round, active enemy cards can apply damage (step 804) to the players' main characters. In various examples, all active enemy cards can apply damage. In various examples, any enemy card revealed during the current round may not cause damage to the players' main characters. In various examples, the main character card for each player can receive the damage resulting from the damage effect of each of the active enemy cards, as applicable. For example, in response to enemy card 500 being an active enemy card, each main character can receive 1 damage from enemy damage effect 542. Thus, for example, first main character card 400A (which can belong to the first player for this example) can receive 1 damage, and second main character 400B (which can belong to the opponent for this example) can receive 1 damage. If there are additional active enemy cards, damage for each enemy damage effect of each respective active enemy card can be applied to each main character (e.g., the total of all damage effects of all active enemy cards can be applied to each main character).

In various examples, a player can play a suit card in order to block the damage from an active enemy card. A player can play a suit card comprising a card type that matches the enemy block type of an active enemy card. For example, to block the 1 damage applied from enemy card 500, a player can play a suit card comprising a card type Y. Thus, if a player has suit card 700B in the player's hand, for example, the player can play suit card 700B to prevent the 1 damage from enemy card 500 being applied to the player's main character. The played suit card used to block can be dis-carded (e.g., in discard space 204 of game surface 200) after such a play. Playing a suit card to block damage from an enemy card can be applied to one or more enemy cards to block the damage therefrom.

In response to applying the damage effects of active enemy cards, the remaining hit points of each main character can be determined (step 806). For example, the 1 damage applied to each of first main character card 400A and second main character 400B can result in the remaining hit points for first main character card 400A of 19 (20 minus 1), and the remaining hit points for first main character card 400B of 17 (18 minus 1). In determining the remaining hit points for the main characters, any blocks can be taken into account, as discussed herein.

Main character hit points can be tracked in any suitable manner. For example, for every damage dealt to a main character, an object (e.g., a marble, chip, token, or the like) can be placed on or around, or can be otherwise associated with, the main character to indicate the amount of damage that main character has taken (e.g., each object can represent one damage). In response to the number of objects associ-ated with a main character equaling the total hit point value for the main character, the main character may be defeated (i.e., the hit points are reduced to zero). As another example, a player can have a hit point die (e.g., a twenty-sided die (D20), such as D20 245), and can set the hit point die to have the surface showing a value equal to the main character's hit point value facing upward. Each time the main character's hit points are adjusted (reduced or increased), the player can reflect such a hit point adjustment by moving the hit point die to show the appropriate value on the upward-facing surface. As shown in FIG. 2B, the respective player's main character is showing 15 hit points remaining.

In various examples, each trick phase can require at least two suit cards from each player. Therefore, if a player has one or zero suit cards left in their hand, the player's main character can receive three damage (or any other suitable damage amount for insufficient suit cards). In response to the player's main character remaining alive (e.g., the remaining hit points have not gone to zero), the player can reload the player's hand by drawing a hand number of suit cards (e.g., 10 suit cards) from the suit card deck.

In response to a main character's remaining hit points reaching a level of zero (i.e., the main character has no remaining hit points), whether from damage from an enemy card, from running out of suit cards, or any other reason, the main character can be defeated or die. Such an event would likely occur after multiple rounds of active enemy cards dealing damage to the main characters. A dead main char-acter card can be placed in a position or orientation to indicate such a state, such as horizontally or at an angle (e.g., a nonparallel, nonorthogonal angle) relative to an edge of the game surface (e.g., the game surface edge proximate to the respective player), facedown, and/or the like. In response to a player's main character dying, the player can discard all remaining suit cards in the player's hand and draw a new hand of the original number (the hand number) of suit cards used to start the game (e.g., 10 suit cards) from suit card deck 310, or any other suitable number of suit cards (e.g., fewer than the original number of suit cards as a punishment for dying). In various examples, the player can keep any remaining suit cards in the player's hand when the respective main character dies, and then draw suit cards from suit card deck 310 to reach the hand number of suit cards. In response to a player's main character dying, such player loses his/her reward card with the highest reward victory point value, which can be discarded and/or shuffled back into the appropriate reward card stack. In response, the dead main character can be revived, thus allowing the associated player to participate in the following trick phase of the game or round. To indicate main character revival, the main character card can be (re) placed in a position to indicate such a state, such as vertically relative to the respective player, faceup, and/or the like. In response to a main character revival, if the main character effect was previously used (i.e., exhausted), the main character being revived can cause the main character effect to be refreshed and available for effectuation. In various examples, in response to a main character dying, the respective player can draw a new main character card from the main character deck to participate in the following trick phase of the round or game.

In various examples, a trick phase can be conducted (step 808) in a round of the game. The trick phase can be in response to completion of the revealing additional active enemy cards, applying damage from active enemy cards to main characters, and/or determining the remaining hit points of the main characters (e.g., including reviving a main character, drawing a new main character card, refreshing or reloading a player's hand of suit cards, and/or the like).

Figure 9:
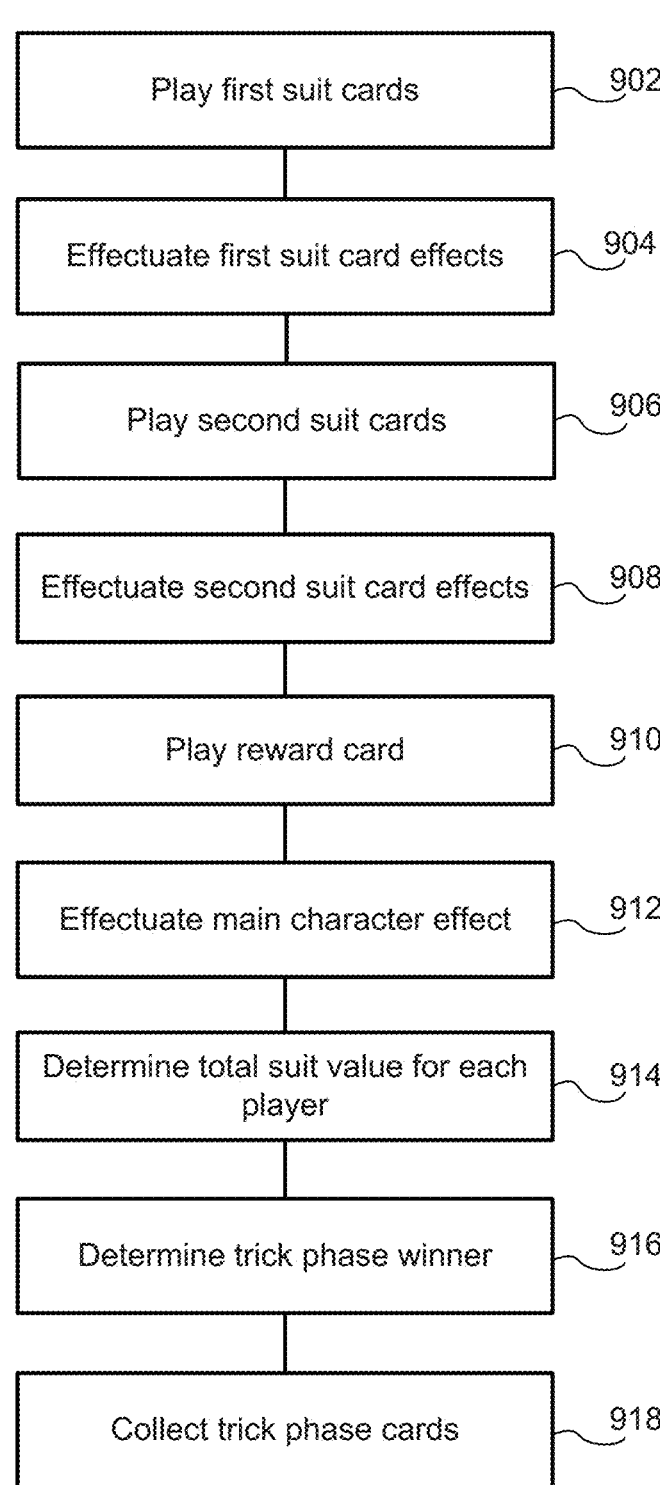
FIG. 9 illustrates a flowchart of an exemplary method for conducting a trick phase during a game, in accordance with various examples.

With additional reference to FIG. 9 depicting a method 900 for conducting a trick phase during a game, during the trick phase, a first trick play and a second trick play can occur. During the first trick play, each player plays a first suit card in a first player sequence. During the second trick play, each player plays a second suit card in a second player sequence. The suit card effects of each suit card played can be effectuated at an appropriate time. In various examples, the first and second player sequences can be the same. In various examples, the second player sequence can be different from, and/or the reverse of, the first player sequence. For example, the first player sequence of the first trick play can start with the first player and proceed to the left, clockwise, or the like, and the second player sequence of the second trick play can start with the last player from the first player sequence and proceed to the right, counterclockwise, or the like.

In various examples, proceeding with the trick phase, the first player in the first trick play can play a first player suit card (step 902). The first player suit card can be played faceup from the first player's hand. The player who plays first in a trick phase can be any desired player, such as the player who was last ranked in a previous trick phase. For the first trick phase in a game, player order can be determined in any suitable manner, such as randomly (e.g., by rolling a die and the player with the highest die roll does first), flipping a digital coin, and/or the like. The card suit of the first player card establishes a first chosen suit for the first trick play of the respective trick phase. In response to the first player playing the first player suit card, the first player sequence can proceed with the opponent playing a first opponent suit card (step 902). The first opponent suit card can be played faceup. The first player sequence can continue with any other players playing respective suit cards from their hands in the first player sequence (e.g., proceeding to the left, clockwise, and/or the like).

Suit cards played by subsequent players after the first player of a player sequence during a trick play can play suit cards that comprise the chosen suit established by the first suit card played during the trick play, or a different suit. In response to a player playing a suit card having a card suit that is the same as the chosen suit, the suit value of the played suit card can contribute to the respective player's total suit value at the end of a trick phase. In response to a player playing a suit card having a card suit that is different than the chosen suit (an off-suit card), the suit value of the played suit card may not contribute to the respective player's total suit value at the end of a trick phase. In various examples, a player can play an off-suit suit card even if the player has a suit card matching the respective chosen suit. In various examples, a suit card can comprise a wild card suit. In response to such a suit card being played, the respective player can announce the selected card suit.

In response to a player playing an off-suit card, the suit card effect of the suit card can be effectuated, and then the suit card can be assigned as damage to an active enemy card by the respective player (assigning damage to active enemy cards is discussed further herein). Thus, a player may wish to play an off-suit suit card to effectuate the associated suit card effect at the desired time (rather than waiting for a matching chosen suit) and assigning damage to an enemy card. Accordingly, continuing with the example above, the first opponent suit card can comprise the first chosen suit or a different suit. The first suit card played by each player can be disposed face up, for example, in first play area 252 of player area 250.

In response to the first player playing the first player suit card, the suit card effect of the first player suit card can be effectuated (step 904). Effectuation of the first player suit card effect can occur before or after the opponent plays the first opponent suit card. As discussed herein, a suit card effect can have any desired effect, such as an effect on an enemy card (e.g., applying damage to an active enemy card, automatically defeating an active enemy card, drawing an enemy card from the enemy card deck to make such enemy card active, blocking an enemy damage effect from an active enemy card, and/or the like), an effect on a player's main character (e.g., healing a main character by adding hit points, damaging another player's main character by removing hit points, refreshing a main character effect that has previously been used or exhausted, and/or the like), an effect on a player's hand (e.g., causing a player to draw one or more suit cards, causing a player to discard one or more suit cards, and/or the like), an effect on a player's turn or status (e.g., causing a player to draw one or more reward cards, causing a player to discard one or more reward cards, refreshing a previously exhausted reward card effect, and/or the like), an effect on the number of cards played by a player during a trick phase or the first or second trick play (e.g., allowing the addition of another suit card (one or more) to the player's first or second play, adding value to one or more of a player's played suit cards, subtracting value from or nullifying one or more of a player's played suit cards, preventing another player's suit card effect, and/or the like), and/or affecting an outcome of the trick phase (e.g., determining a player to automatically be, or not be, the winner of a trick phase). For example, in response to the first player suit card being suit card 700A, suit card effect 715A can be effectuated by drawing an enemy card from the enemy card deck and disposing it faceup on the game surface. Because the resulting enemy card is newly-active, no damage may be dealt from such enemy card until a subsequent round of the game. The most-recently drawn or revealed enemy card can be disposed on or most proximate enemy card deck area 220 faceup. Accordingly, an enemy card that was previously disposed on or most proximate enemy card deck area 220 can be moved to a first enemy card space 222, and all other active enemy cards can be shifted or moved similarly to a subsequent active enemy card space (e.g., to active enemy card spaces 224-228). Accordingly, active enemy cards can be in a line or other arrangement (e.g., in enemy card series 229) which can indicate which active enemy cards may have been active the longest.

In response to the opponent playing the first opponent suit card, the suit card effect of the first opponent suit card can be effectuated (step 904). Effectuation of the first opponent suit card effect can occur before, during, or after effectuation of the suit card effect of the first player suit card. For example, in response to the first opponent suit card having the suit card effect of suit card 700B, the suit card effect of the first opponent suit card can be effectuated by the opponent adding a card to the trick play. Adding a card to a trick play can comprise adding a suit card to player area 250 (e.g., at added cards area 256). An added suit card can be disposed facedown, hiding any characteristics or statistics of such added suit card from the other player(s), or can be played face-up. An added suit card can be different from a played suit card during a trick phase in that the suit card effect of a played suit card can be effectuated, while the suit card effect of an added suit card may not be effectuated. In various examples, the added suit card can have a suit that is different that the current chosen suit, and the suit value of the added suit card can still be counted toward the respective player's total suit value. Also, a played suit card can be played faceup, and an added suit card can be added face-down. Thus, game strategy can include adding suit cards to a trick phase (e.g., when instructed by a suit card effect, reward effect, and/or main character effect) with less helpful suit card effects (e.g., such as a negative suit card effect). Further game strategy can include adding suit cards face-down to a trick phase with a relatively high suit value (to hide the added value to the player's total suit value, thus trying to win the trick phase), or with a relatively low suit value (to bluff the other player(s) into playing suit cards with higher suit values to try and win the trick phase, thus, causing the other player(s) to use up such suit cards).

In response to completion of the first trick play (e.g., all players playing their respective first suit card and effectu-ating the associated suit card effect), the players can play their second suit cards (step 906) and the associated second suit cards effects can be effectuated (step 908) in the second trick play of the trick phase. The second suit cards played in a trick phase can be disposed, for example, in second play area 254 of player area 250. As discussed herein, the second player sequence (i.e., player order) for the second trick play can be the reverse of the first player sequence (i.e., player order) for the first trick play (playing the players' first suit cards) (e.g., to the right, counterclockwise, and/or the like). Thus, the player who played their suit card last in the previous trick play can go first in the subsequent trick play (thus, that player can play two suit cards in a row). Con-tinuing with the above example, for the second trick play, the opponent can play a second opponent suit card. The card suit of the first-played suit card in a subsequent trick play during a trick phase (e.g., the second trick play) may not be required to comprise a card suit established in a previous trick play to be counted toward the total suit value for the respective player. According, the first suit card played during the second trick play can establish a second chosen suit.

In response to the opponent playing the second opponent suit card, the suit card effect of the second opponent suit card can be effectuated. For example, in response to the second opponent suit card having the suit card effect of suit card 700C, the suit card effect of the second opponent suit card can be effectuated by the opponent drawing a suit card from the suit card deck and adding it to the opponent's hand. The drawn suit card can be played in subsequent trick plays of the same trick phase or a subsequent trick phase.

Continuing with the above example, in response to the opponent playing the second opponent suit card and/or the associated suit card effect being effectuated, the first player can play a second player suit card and the associated suit card effect can be effectuated. The suit card effects of the second opponent suit card and the second player suit card can be effectuated in the order in which such suit cards were played, or at the same time.

In various examples, a player can play a reward card (step 910) during a trick phase. As discussed herein, a reward card effect can have any desired effect, such as an effect on an enemy card (e.g., applying damage to an active enemy card, automatically defeating an active enemy card, drawing an enemy card from the enemy card deck to make such enemy card active, blocking an enemy damage effect from an active enemy card, and/or the like), an effect on a player's main character (e.g., healing a main character by adding hit points, damaging another player's main character by remov-ing hit points, refreshing a main character effect that has previously been used or exhausted, and/or the like), an effect on a player's hand (e.g., causing a player to draw one or more suit cards, or causing a player to discard one or more suit cards, and/or the like), an effect on a player's turn or status (e.g., causing a player to draw one or more reward cards, causing a player to discard one or more reward cards, refreshing a previously exhausted reward card effect, and/or the like), an effect on the number of cards played by a player during a trick phase or the first or second play (e.g., allowing the addition of another suit card (one or more) to the player's first or second play, adding value to one or more of a player's played suit cards, subtracting value from or nullifying one or more of a player's played suit cards, preventing another player's suit card effect, and/or the like), and/or affecting an outcome of the trick phase (e.g., determining a player to automatically be, or not be, the winner of a trick phase). For example, in response to a player playing reward card 600, reward card effect 642 can be effectuated. Thus, the player who played reward card 600 can add a suit card having Suit A to a trick play (similar to the process of adding a card discussed in relation to effectuating a suit card effect in step 904).

A reward card can be played at any suitable time (e.g., before, during, or after a trick phase). For example, a player can play a reward card during the player's turn to play a suit card during a trick play of a trick phase. The reward card effect of the played reward card can be effectuated in response to playing the reward card (e.g., immediately after). In response to the reward card effect being utilized, the reward card can be exhausted. Exhaustion of a reward card can be indicated in any suitable manner, such as disposing the respective reward card horizontally or at an angle (e.g., a nonparallel, nonorthogonal angle) relative to an edge of the game surface (e.g., the game surface edge proximate to the respective player), facedown, associating a token or object therewith (e.g., placing such object on or proximate the reward card), and/or the like. In various examples, there can be a limit to the number of reward cards played by a player during a turn or trick phase (e.g., one or two, or more), or there may be no limit.

In various examples, a player can effectuate the main character effect (step 912) of their respective main character card during a trick phase. As discussed herein, a main character effect can have any desired effect, such as an effect on an enemy card (e.g., applying damage to an active enemy card, automatically defeating an active enemy card, drawing an enemy card from the enemy card deck to make such enemy card active, blocking an enemy damage effect from an active enemy card, and/or the like), an effect on a player's main character (e.g., healing a main character by adding hit points, damaging a player's main character by removing hit points, refreshing a player's main character effect that has previously been used or exhausted, and/or the like), an effect on a player's hand (e.g., causing a player to draw one or more suit cards, or causing a player to discard one or more suit cards, and/or the like), an effect on a player's turn or status (e.g., causing a player to draw one or more reward cards, causing a player to discard one or more reward cards, refreshing a previously exhausted reward card effect, and/or the like), an effect on the number of cards played by a player during a trick phase or the first or second play (e.g., allowing the addition of another suit card (one or more) to the player's first or second play, adding value to one or more of a player's played suit cards, subtracting value from or nullifying one or more of a player's played suit cards, preventing a player's suit card effect, and/or the like), and/or affecting an outcome of the trick phase (e.g., determining a player to automatically be, or not be, the winner of a trick phase). For example, in response to a player having main character card 400A and effectuating main character effect 440A, value can be added (+1) to each suit card associated with the player during the trick phase (e.g., played suit cards (faceup) and added suit cards (facedown)). As another example, in response to a player having main character card 400B and effectuating main character effect 440B, the player can select one active enemy card and defeat it. The defeated enemy card can be discarded, and the player can draw a reward card from the reward card deck in response to defeating the enemy card. The reward card drawn can have a reward rating equal to or less than the enemy rating of the defeated enemy card. Accordingly, the player can draw a reward card from the appropriate reward card stack.

The main character effect of a main character card can be effectuated at any suitable time (e.g., before, during, or after a trick phase). For example, a player can effectuate a main character effect during the player's turn to play a suit card during a trick play of a trick phase. The main character effect can be effectuated when indicated by the respective player (e.g., immediately). In response to the main character effect being utilized, the main character can be exhausted. Exhaustion of a main character card can be indicated in any suitable manner, such as disposing the respective main character card horizontally or at an angle (e.g., a nonparallel, nonorthogonal angle) relative to an edge of the game surface (e.g., the game surface edge proximate to the respective player), facedown, associating a token or object therewith (e.g., placing such object on or proximate the main character card), and/or the like. The main character effect can be refreshed in response to the main character dying (i.e., getting its hit points reduced to zero) and being revived, as discussed herein.

A trick phase can comprise any suitable number of trick plays (e.g., during each trick play, each player plays a suit card in the appropriate player sequence, as discussed herein, and the effect of such suit card, and any played reward cards or main character effects, are effectuated). In various examples, a trick phase can comprise one, two, or three trick plays (thus, each player can play one, two, or three suit cards each, respectively). In various examples, a trick phase can comprise two trick plays (thus, each player can play two suit cards).

In response to the trick plays of a trick phase being completed, the total suit value for each player can be determined (step 914) for the trick phase. The total suit value for each player for a trick phase can be the sum of the suit values of all suit cards played or added by the respective player during such trick phase. Continuing with the above example, the total suit value for the first player can be the suit values of the first and second player suit cards played during the trick phase, along with any added suit cards and/or suit value adjustments (e.g., additions or subtractions) resulting from suit card effects, reward effects, and/or main character effects, as discussed herein. The total suit value for the opponent can be the suit values of the first and second opponent suit cards played during the trick phase, along with any added suit cards resulting from suit card effects, reward effects, and/or main character effects, as discussed herein.

In response to determining the total suit values for each player, a trick phase winner can be determined (step 916). In various examples, the trick phase winner can be the player having the highest total suit value. In response to there being a tie between two or more players having the highest total suit value, the player having the suit card with the greatest suit value can be the trick phase winner. If there is still a tie, there can be a hierarchy of card suits, so the higher card suit of the greatest suit value suit card wins. If there is still a tie, then continue this process with the suit card having the second highest value for each player, etc. In various examples, the trick phase winner can be determined in response to a main character effect, a reward effect, and/or a suit card effect (e.g., determining that a certain player is automatically the trick phase winner). As part of determining the trick phase winner, a ranking of players can be determined. The ranking of players can be determined based on the total suit value for each player. For example, the trick phase winner can be the player with the highest total suit value (or as declared by a main character effect, a reward effect, and/or a suit card effect), so the trick phase winner can have a first rank for the respective trick phase. The remaining players can be ranked from highest to lowest after the trick phase winner in descending order based on their respective total suit values. For example, the player with the highest total suit value after the trick phase winner can be ranked second (e.g., in various examples, second highest total suit value overall), the player with the highest total suit value after the second ranked player can be ranked third (e.g., in various examples, third highest total suit value overall), the player with the highest total suit value after the third ranked player can be ranked fourth (e.g., in various examples, fourth highest total suit value overall), and so on.

In various examples, all suit cards played or added by the players during can be referred to as "trick cards." In response to determining the trick phase winner, the trick phase winner can collect all trick cards (step 918) from the trick phase (e.g., all played and added trick cards, excluding any off-suit suit cards played, which have been assigned as damage to an active enemy card). A trick phase may end upon the trick cards being collected by the trick phase winner.

Referring back to FIG. 8, in response to conclusion of a trick phase, method 800 can continue by the trick phase winner assigning damage to active enemy cards (step 810). In various examples, each trick phase card can equal one damage that can be assigned to an active enemy card. In various examples, each trick phase card can equal an amount of damage equal to the suit value of the respective trick card. Each trick card can be assigned to an active enemy card, dealing the respective amount of damage to the assigned active enemy card (e.g., one damage per assigned trick card). The trick cards can be assigned in any number and combination to one or more active enemy cards. Each trick card may only be able to be assigned to one active enemy card (i.e., a single trick card may not be assigned to multiple active enemy cards). In various examples, all trick cards can be assigned to an active enemy card.

In response to all trick cards being assigned to active enemy cards, the status of each active enemy card can be determined (step 812). In response to an active enemy card receiving an amount of damage equal to or greater than the enemy hit points, the active enemy card can be defeated. For example, if enemy card 500 is an active enemy card, in response to receiving three or more trick cards (each representing one damage), enemy card 500 is defeated. In various examples, an active enemy card may not be assigned more damage than the enemy hit point value (i.e., the assigned damage cannot be greater than the enemy hit point value). Any active enemy cards that are not defeated (having less damage assigned thereto than the respective enemy hit point value) remain active and the assigned damage can stay with the respective active enemy card for subsequent rounds and trick phases. For example, the assigned trick cards (that are now damage to the respective active enemy card) can be stacked under the respective active enemy card so the players can see how many cards are associated with such active enemy card. As that active enemy card moves on the game surface (e.g., along enemy card series 229), the assigned trick cards (damage) can move along with the assigned active enemy card.

In response to an active enemy card being defeated, a reward card can be drawn (e.g., by the player who assigned the damage that defeated the respective active enemy card, or any other player). A certain number of reward cards (which can be any suitable number) can be drawn for each enemy card defeated. For example, one reward can be drawn from the reward card deck for each active enemy card defeated. The reward card drawn can comprise a reward rating equal to or less than the enemy rating of the respective defeated enemy card. Thus, the reward card drawn can be drawn from the appropriate reward card stack having reward cards with the appropriate reward rating. For example, in response to defeating enemy card 500, a reward card can be drawn from the weak reward card stack. The drawn reward card(s) can be revealed or remain facedown.

The drawn reward cards can be distributed (step 814). In various examples, the trick phase winner can have first pick of the drawn reward cards, and add the selected reward card faceup to the trick phase winner's reward cards (e.g., in reward card space 262 or 264 in player area 250). In response to only one reward card being drawn, the trick phase winner receives the reward card. In response to multiple reward cards being drawn, the trick phase winner first chooses a desired reward card, then the other players each can choose a reward card in order of their ranking from the trick phase (e.g., the second-ranked player gets second choice of the drawn reward cards, the third-ranked player gets third choice of the drawn reward cards, etc.). The drawn reward cars, in various examples, can remain facedown until selected. Thus, depending on player strategy, reward cards with hard ratings may be drawn before reward cards with medium or weak ratings. If all players have selected a reward card and there are drawn reward cards remaining, the selection order can begin again, starting with the trick phase winner.

In response to an active enemy card being defeated by some other action besides assignment of trick cards (e.g., by assigning an off-suit suit card to an active enemy card as damage, by defeating an active enemy card from a main character effect, a reward effect, and/or a suit card effect, and/or the like), the player responsible for the damage or action that caused the active enemy card defeat can receive the resulting drawn reward card.

In various examples, in response to the most-recently activated or revealed enemy card being defeated, a new enemy card can be immediately revealed to take the defeated enemy card's place. Thus, assigning damage to the most-recently activated or revealed enemy card may not be as desirable because defeat of such enemy card will not result in a fewer number of active enemy cards.

In response to all drawn reward cards being assigned to a player, the victory point amount for each player can be determined (step 816). The victory point amount for each player can be the sum of all victory points acquired by such player. The reward cards possessed by a player each have a victory point value, and therefore, the victory point values of all of a player's reward cards can be added to determine the victory point amount for that player. In order to win the game, a player can accumulate a victory point amount that equals or exceeds a victory point threshold. In response to a player having a victory point amount that equals or exceeds a victory point threshold, that player can be determined the winner of the game (step 820).

In response to a tie between two or more players that meet or exceed the victory point threshold, the player with the most reward cards (or, in another example, with the fewest reward cards) wins. If the tied players have the same number of reward cards, then the player with the most remaining hit points wins.

In response to no player accumulating a victory point amount that equals or exceeds the victory point threshold, the game can advance to the next round (step 818). For a subsequent round, method 800 can return to step 804 to conduct another round 818. Any damage assigned to an active enemy card can remain with such active enemy card. The suit cards remaining in each player's hand can remain. A player may not draw additional suit cards (unless the player does not have enough suit cards in the player's hand to complete the next trick phase, in which case the player can reload the player's hand, as discussed herein). The next round can begin by revealing a new active enemy card from the enemy card deck and dealing damage from the active enemies, as discussed herein with relation to step 804. As discussed, the newly-revealed active enemy card may not deal damage in the same round in which it is revealed. Enemy cards that became active in a previous round can deal damage to each player's main character card. When conducting a trick phase in a subsequent round, the last ranked player (or the first ranked player) from the previous round or trick phase can be the first player to play a suit card in the first trick play of the subsequent trick phase. Rounds in a game can continue to take place until one or more players achieves a victory point amount that equals or exceeds the victory point threshold.

Figure 10:
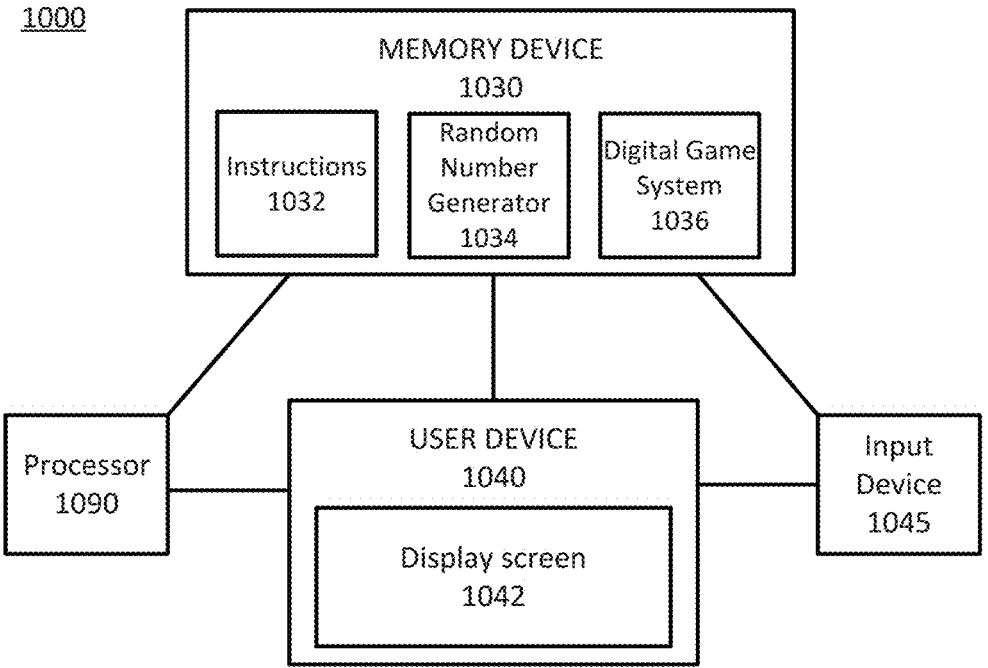
FIG. 10 illustrates a schematic diagram of an electronic or digital game system, in accordance with various examples.
Figure 11:
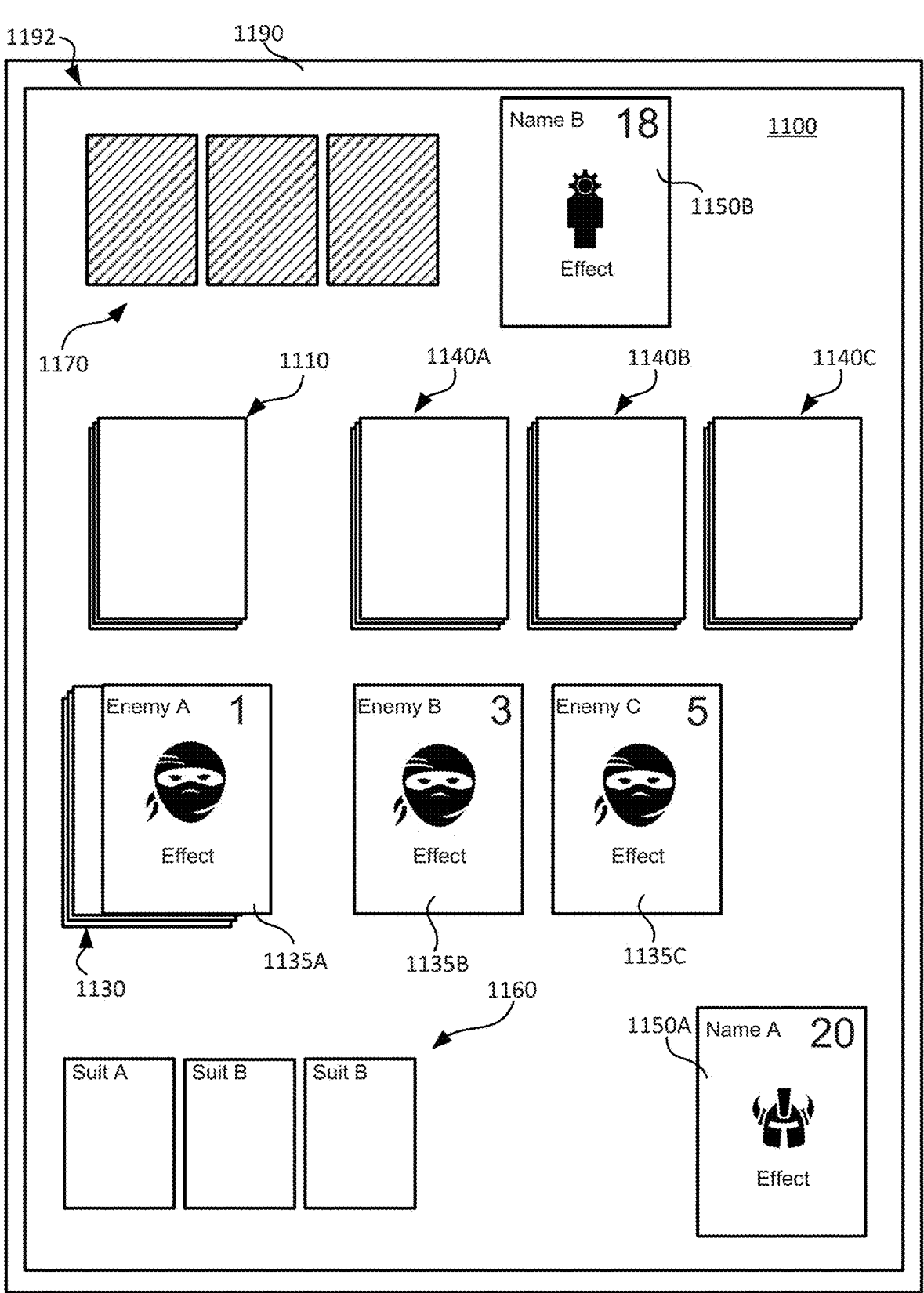
FIG. 11 illustrates a graphical user interface for an electronic or digital game system, in accordance with various examples.

FIGS. 1-9 depict components and methods for a game system 100 implemented as a physical system. In various examples, the game of game system 100 can be implemented electronically and/or digitally. With reference to FIG. 10, in accordance with various examples, a system 1000 may be computer-based, and may comprise a processor 1090, a tangible non-transitory computer-readable memory device 1030, a user device 1040, and/or an input device 1045. In various examples, any or all of the components of system 1000 can be integrated, and/or in electronic communication, with one another via one or more application programming interfaces (APIs). System 1000 and/or any of the components comprised therein can be computer-based, and can comprise a processor (e.g., processor 1090), a tangible non-transitory computer-readable memory, and/or a network interface. Instructions stored on the tangible non-transitory memory (e.g., instructions 1032) can allow system 1000 or processor 1090, or the components therein, to perform various functions, as described herein. In various examples, each component of system 1000 can have a separate processor performing functions, or processor 1090 can be located in one or more components of system 1000, or processor 1090 can be a separate component of system 1000.

In various examples, memory device 1030 can comprise hardware and/or software capable of storing data and/or analyzing information. Memory device 1030 can comprise a server appliance running a suitable server operating system (e.g., MICROSOFT INTERNET INFORMATION SERVICES or, "IIS") and having database software (e.g., ORACLE, mySQL) installed thereon. Memory device 1030 can be in electronic communication with a processor 1090, a user device 1040, and/or an input device 1045 via a network. As such, memory device 1030 can be able to communicate, and/or share information, with processor 1090, user device 1040, and/or input device 1045. Memory device 1030 can comprise a digital game system 1036 and its components, and/or instructions therefor (e.g., instructions 1032). Digital game system 1036 can be similar to game system 100 and its components and processes (as discussed herein in relation to FIGS. 1-9), such as a digital version thereof, including a digital game surface, an original digital deck of cards having a digital main character card deck, a digital suit card deck, a digital enemy card deck, and/or a digital reward card deck, and/or digital cards associated with a respective digital deck (e.g., digital main character cards, digital suit cards, digital enemy cards, and/or digital reward cards). Digital main characters cards can have the same or similar characteristics or functions within a game as the physical counterparts, e.g., main character cards 400A,B. The other digital card types (e.g., digital suit cards, digital enemy cards, and/or digital reward cards) of digital game system 1036 can have the same or similar characteristics, effects, structures, layouts, and/or functions within the digital game as the physical card counterparts (e.g., suit cards, enemy cards, and/or reward cards, respectively) within a physical game, as discussed herein. Additionally, the game rules, flow, actions, and the like associated with and discussed with regard to game system 100 and FIGS. 1-9 can also apply to digital game system 1036 and FIGS. 10-13.

Instructions 1032 can be configured to allow system 1000 to perform various operations to facilitate digital game system 1036 and its functions. Random number generator 1034 comprised in memory device 1030 can be utilized in operating digital game system 1036, as discussed herein. In various examples, instructions 1032, random number generator 1034, and/or digital game system 1036 can be comprised in one system, device, and/or component of system 1000 and/or memory device 1030, or the same can be separated or combined in any suitable configuration.

In various examples, memory device 1030 can store program code and or instructions 1032 executable by the processor 1090. Memory device 1030 can also store other data such as image data, event data, player input data, random or pseudo-random number generators, and applicable game rules that relate to the play of the digital game. Memory device 1030 can be a tangible non-transitory computer-readable memory. Random number generator 1034 can assist in randomizing the cards in a digital card deck and randomizing selection thereof, and/or randomizing the value resulting from rolling digital dice or conducting other like actions. The random number generator 1034 can use various methodologies, for example, the random number generator techniques and systems set forth in U.S. Pat. No. 9,336,646 (which is hereby incorporated by reference), or any other random number generator techniques or systems now known or hereinafter devised.

In various examples, memory device 1030 can include random access memory (RAM), which can include non-volatile RAM (NVRAM), magnetic RAM (MRAM), ferroelectric RAM (FeRAM), and other forms as commonly understood in the gaming industry. In various examples, memory device 1030 can include read only memory (ROM). In various embodiments, memory device 1030 includes flash memory and/or EEPROM (electrically erasable programmable read only memory). It should be appreciated that, any other suitable magnetic, optical, and/or semiconductor memory can operate in conjunction with the system 1000.

Input device(s) 1045 can be an aspect of a graphical user interface (GUI) displayed on display screen which, in response to being selected, allows a user of system 1000 to produce an input signal received by a processor, which can command the processor to perform or facilitate performance of an operation. For example, input device 1045 can be a digital button displayed on a display screen (e.g., a touch screen) which can be selected by tapping the screen on a touch screen or selecting input device 1045 with a computer mouse, and/or input device 1045 can be a physical button to input information.

In various examples, memory device 1030 and/or user device 1040 can comprise a processor therein and/or utilize a processor in another component of system 1000 (e.g., processor 1090). The processor can be configured to cause the components of digital game system 1036 to interact with one another, to receive inputs from the user through an input device 1045, perform or execute the functions, or instruct/facilitate the performance of functions, including, for example, presenting information on a GUI to facilitate gameplay of a digital game system, randomly provide digital suit cards to a player as part of their hand, play digital suit cards in response to providing a computer player(s) for one-player game play, randomly provide digital main character cards, digital enemy cards, and/or digital reward cards, determine outcomes of different plays or actions (e.g., the effects of digital cards that are played and/or active, whether an active digital enemy card is defeated, whether a digital main character card is defeated or died, and/or the like), turns (e.g., determining the order of players to play digital suit cards or other digital cards during a trick phase or trick play within a trick phase), rounds (e.g., determining if/when a player has enough digital suit cards to complete a forthcoming trick phase), and/or the like.

In various examples, user device 1040 can incorporate hardware and/or software components. For example, user device 1040 can comprise a server appliance running a suitable server operating system (e.g., MICROSOFT INTERNET INFORMATION SERVICES or, "IIS"). User device 1040 can be any device that allows a user to communicate with a network (e.g., a personal computer, personal digital assistant (e.g., IPHONE®, BLACKBERRY®), tablet, smartphone, cellular phone, and/or the like). User device 1040 can be in electronic communication with electronic memory device 1030, processor 1090, and/or input device 1045. In various examples, user device 1040 can comprise an input device 1045 (i.e., a physical or digital button). User device 1040 can allow the user of system 1000 to interact with the other components of system 1000. For example, user device 1040 can comprise display screen 1042, which can display a GUI (e.g., GUI 1100, discussed in relation to FIG. 11) provided by system 1000. Display screen 1042 displaying a GUI can allow the user to select input device(s) 1045 to send a signal to system 100 indicating a desired action by system 1000. In various examples, any action performed by a user through system 1000 can be communicated to system 1000 and performed by a processor (e.g., processor 1090).

User device 1040 includes any device (e.g., personal computer, mobile device, etc.) which communicates via any network, for example such as those discussed herein. In various examples, user device 1040 can comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser can communicate with a server via network by using Internet browsing software installed in the browser. The browser can comprise Internet browsing software installed within a computing unit or a system to conduct online transactions and/or communications. These computing units or systems can take the form of a computer or set of computers, although other types of computing units or systems can be used, including laptops, notebooks, tablets, handheld computers, personal digital assistants, set-top boxes, workstations, computer-servers, mainframe computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various examples, browser can be configured to display an electronic channel.

In various examples, a user device (e.g., as part of system 1000) described herein can run a web application or native application to communicate with system 1000. A native application can be installed on the user device via download, physical media, or an app store, for example. The native application can utilize the development code base provided for use with the operating system and capable of performing system calls to manipulate the stored and displayed data on the user device and communicates with system 1000 and/or any components thereof. A web application can be web-browser compatible and written specifically to run on a web browser. The web application can thus be a browser-based application that operates in conjunction with system 1000.

In various examples, memory device 1030 can comprise instructions 1032 to present a GUI to a player on a user device to allow digital game system 1036 to be played. With additional reference to FIG. 11, display screen 1192 of a user device 1190 (an example of display screen 1042 on user device 1040) can display components of digital game system 1036 on a game system GUI 1100 to facilitate playing of the digital game. The components of digital game system 1036 can be similar to the physical game discussed in relation to game system 100.

Similar to game system 100 discussed in relation to FIGS. 1-9, digital game system 1036 can comprise a digital deck of cards, which is an original deck of digital cards having various digital card types. The digital cards can be representations of digital items, which can be represented in any other suitable form (e.g., as digital tokens, items, figures, and/or any other suitable image or symbol). A digital card deck for digital game system 1036 can comprise one or more original sub-decks of digital cards (each sub-deck may also be referred to as a digital "deck" herein). For example, a digital card deck for digital game system 1036 can comprise a digital main character card deck (similar to main character card deck 320 of game system 100, including the number of digital main character cards therein), a digital suit card deck (similar to suit card deck 310 of game system 100, including the number of digital suit cards therein), a digital enemy card deck (similar to enemy card deck 330 of game system 100, including the number of digital enemy cards therein), and/or digital reward card deck (similar to reward card deck 340 of game system 100, including the number of digital reward cards therein). A digital deck of cards can be compiled by one or more players collecting physical cards having digital card counterparts, or digital-only cards, and create the digital card deck on the player's account or profile within digital game system 1036.

Similar to game play of game system 100, a first player can have a first player digital main character card 1150A, and an opponent can have an opponent digital main character 1150B, which can be displayed by a processor on GUI 1100. The digital main character cards can have the same or similar displayed structure on GUI 1100 as the structure of the main character cards discussed in relation to game system 100 (e.g., main character cards 400A and 400B in FIGS. 4A and 4B). For example, a digital main character card can comprise a main character name or title and hit point value proximate a top edge of the digital card, a character image or symbol, and/or a main character effect. For reference, digital main character card 1150A is a digital version of main character card 400A in FIG. 4A, and digital main character card 1150B is a digital version of main character card 400B in FIG. 4B, and the aspects or statistics displayed on the digital cards correspond to the aspects or statistics displayed on the physical cards.

In various examples, GUI 1100 can be presented to a first player (e.g., the user of user device 1090). Thus, the opponent can be another user utilizing another device and providing inputs to system 1000 to play digital game system 1036, or the opponent can be a computer player operated by a processor, thus allowing one-player gameplay. GUI 1100 can display the digital suit card deck 1110, from which the players can receive the digital suit cards for the players' hands. Digital suit card deck 1110 can be displayed in GUI 1100 facedown so the players cannot see the next digital suit card, or any digital cards, in digital suit card deck 1110. The first player's hand 1160 can be displayed on GUI 1100, which are the digital suit cards available to play by the first player during the first player's turn during a round, trick phase, or trick play. The opponent's hand 1170 of digital suit cards can be displayed on GUI 1100 facedown (i.e., hidden from the first player viewing GUI 1100), which can be the digital suit cards available to play by the opponent during the opponent's turn during a round, trick phase, or trick play.

The hand of digital cards can comprise any suitable number of cards (e.g., about ten digital suit cards). If there are additional players in a game (e.g., a third player or fourth player) a digital main character card and/or hand of digital suit cards can be displayed similar to those for the opponent.

In various examples, GUI 1100 can display a digital enemy card deck 1130, from which digital enemy cards can be revealed to become active digital enemy cards (e.g., active digital enemy cards 1135A-C). The most-recently revealed digital enemy card can be disposed on, over, and/or most proximate to the digital enemy card deck. For example, digital enemy card 1135A may be the most-recently revealed digital enemy card from digital enemy card deck 1130. The active digital enemy cards can be disposed in a line on GUI 1100 or any desired arrangement or configuration, such as those discussed with regard to active enemy cards in game system 100.

In various examples, GUI 1100 can display a digital reward card deck, from which digital reward cards can be drawn in response to defeating digital enemy cards. The digital reward card deck can comprise reward cards having reward ratings. For example, the digital reward card deck can comprise digital reward cards with one of three ratings (e.g., weak, medium, and hard digital reward cards). Each digital reward card can comprise a marker or identifier associated with the respective digital reward card indicating the reward card rating. Accordingly, the digital reward cards in the digital reward card deck can be separated into digital reward card stacks-one for each reward card rating. For example, digital reward card stack 1140A can be a weak digital reward card stack, digital reward card stack 1140B can be a medium digital reward card stack, and/or digital reward card stack 1140C can be a hard digital reward card stack.

FIG. 12 illustrates a method 1200 for playing a digital game system 1036, for example, utilizing GUI 1100, in accordance with various examples. The functions and/or operations of digital game system 1036 can be performed by one or more processors, as discussed herein. In various examples, the processor can determine a player order for the game, round, trick phase, and/or trick play. For example, the processor can randomly determine the player order by rolling digital dice associated with each player and granting the first turn to the player with the highest digital dice roll, flipping a digital coin, and/or the like. In response to a round ending, the processor can determine that the player who was the lowest ranked player during the previous trick phase can go first in the subsequent round or trick phase.

In various examples, the processor can shuffle, or otherwise randomize (e.g., during selection from) the digital suit card deck, the digital enemy card deck, and/or the digital reward card deck. The processor can separate the digital reward card deck into the digital reward card stacks each having the digital reward cards with the appropriate reward card rating. The processor can use random number generator 1034 to randomize the digital cards in each digital card deck. To begin a game, the processor can assign a digital main character card to each player (step 1202). In various examples, such digital main character cards can be randomly selected by the processor from the digital main character deck and/or can be the first digital cards in the randomized (i.e., shuffled) digital main character deck. In various examples, each player can select a digital main character card from the digital main character deck. The processor can receive such selections and assign the selected digital main character card to the respective player. In various examples, the processor can draw about ten digital suit cards for each player from the digital suit card deck 1110 to form the players' hand (step 1204). Such digital suit cards for the players' hands can be randomly selected by the processor from the digital suit card deck and/or can be the first ten digital cards in the randomized (i.e., shuffled) digital suit card deck.

In response to the digital main character selection, the digital main character cards can be displayed on GUI 1100 and associated with the respective player. For example, for first player, digital main character card 1150A can be displayed, and for the opponent, digital main character card 1150B can be displayed. Any other digital main character cards can be displayed for other respective players on GUI 1100.

To begin the game and/or a round 1220 of the game on digital game system 1036, the processor can reveal (e.g., automatically) a digital enemy card from the facedown digital enemy card deck (step 1206). For an easy difficulty game, the processor can reveal one enemy card at the beginning of a round. For a hard difficult game, the processor can reveal multiple enemy cards (e.g., two) at the beginning of a round. Such digital enemy cards that are revealed can be randomly selected by the processor from the digital enemy card deck and/or can be the first or top digital enemy cards in the randomized (i.e., shuffled) digital enemy card deck. The newly-revealed digital enemy card can be disposed faceup on the top of the digital enemy card deck or directly adjacent to the digital enemy card deck (e.g., digital enemy card 1135A disposed on digital enemy card deck 1130 can be the newly-revealed digital enemy card). The position of the newly-revealed digital enemy card can indicate that that specific digital enemy card was revealed during the current round. Revealed digital enemy cards are active digital enemy cards, and active digital enemy cards can apply damage to the players' digital main characters at the beginning of each round.

In various examples, during a round, active digital enemy cards can apply damage (step 1206) to the players' digital main characters. In various examples, all active digital enemy cards can apply damage. In various examples, any digital enemy card revealed during the current round (e.g., digital enemy card 1135A disposed on digital enemy card deck 1130) may not cause damage to the players' digital main characters during the same round. In various examples, the processor can detect the enemy damage effect of each active digital enemy card and apply such damage from each active digital enemy card to each digital main character card, as applicable. For example, in response to digital enemy cards 1135B,C being an active digital enemy cards (and not a newly-revealed digital enemy card 1135A), the processor can apply the enemy damage effect of digital enemy card 1135B to digital main character cards 1150A and 1150B, and apply the enemy damage effect of digital enemy card 1135C to digital main character cards 1150A and 1150B.

In various examples, a player can select a digital suit card from their hand to block the damage from an active digital enemy card. A player can play a digital suit card comprising a card type that matches the enemy block type of an active digital enemy card. The processor can receive such a selection from a player, confirm whether the played card type matches the enemy block type, and if so, apply the blocking action to the respective active digital enemy card. The processor can discard the used digital suit card in response.

The processor can apply the enemy damage effects of active digital enemy cards, taking into account any blocking plays, and determine the remaining hit points of each digital main character (step 1208). The processor can subtract any applied, unblocked damage resulting from each active digital enemy card from the remaining hit points of a digital main character (at the beginning of a game, the remaining hit points for a digital main character will be the digital main character's hit point value). The processor can indicate the remaining hit points for each digital main character, for example, by presenting the same proximate the digital main character card or in a designated area on GUI 1100 (e.g., updating the presented value on a digital D20 die), or update the number in the hit point value portion of the respective digital main character card.

In various examples, each trick phase can require at least two digital suit cards from each player. Therefore, the processor can determine if a player has sufficient digital suit cards left to complete a trick phase. If not, (e.g., if a player has one or zero suit cards left in their hand), the processor can apply three damage (or any other suitable damage amount for insufficient digital suit cards) to the player's digital main character and update the respective remaining hit points accordingly (e.g., by subtracting three hit points). In response to the player's main character remaining alive (e.g., the remaining hit points have not gone to zero), the processor can discard any remaining digital suit card(s) in the player's hand and reload the player's hand by drawing a hand number of digital suit cards (e.g., 10 digital suit cards) from the digital suit card deck, or the processor can allow any remaining digital suit card(s) in the player's hand to remain and reload the player's hand by drawing a number of digital suit cards (e.g., 9 digital suit cards) from the digital suit card deck such that the player has a hand number of cards (e.g., 10 digital suit cards).

In response to a digital main character's remaining hit points reaching a level of zero (i.e., the digital main character has no remaining hit points), whether from damage from a digital enemy card, from running out of digital suit cards, or any other reason, the digital main character can be defeated or die. The processor can indicate that the digital main character card is dead (e.g., by presenting a symbol, marker, color change, or changing the orientation of the digital main character card, for example to a horizontal or angled state, or facedown, and/or the like). In response to a player's main character dying, the processor can discard all remaining digital suit cards in the player's hand and draw a new hand of the original number of digital suit cards used to start the game (e.g., 10 digital suit cards) from digital suit card deck 1110, or any other suitable number of digital suit cards (e.g., fewer than the original number of digital suit cards as a punishment for dying). In response to a player's digital main character dying, the processor can determine which digital reward card belonging to such player has the highest reward victory point value, and discard such digital reward card and/or shuffled it back into the appropriate digital reward card stack (thus, the respective player loses his/her highest reward victory point value digital reward card). In response, the processor can revive the digital main character or assign a new digital main character to the player, thus allowing the associated player to participate in the following trick phase of the game or round. To indicate main character revival, processor can remove the death indictor from the digital main character (e.g., by (re) placing the digital main character card in a position to indicate revival, such as vertically, faceup, and/or the like). In response to a main character revival, if the digital main character effect was previously used (i.e., exhausted), the processor can cause the main character effect of the revived digital main character to be refreshed and available for effectuation, and can provide an indicator for the same.

Proceeding as if the first player was determined to go first, in various examples, the processor can conduct a trick phase (step 1210) in a round of the game. The trick phase can be in response to completion of the revealing additional active digital enemies, applying damage from active digital enemies to digital main characters, and/or determining the remaining hit points of the digital main characters (e.g., including reviving a digital main character, assigning a new digital main character, refreshing or reloading a player's hand of digital suit cards, and/or the like).

Figure 13:
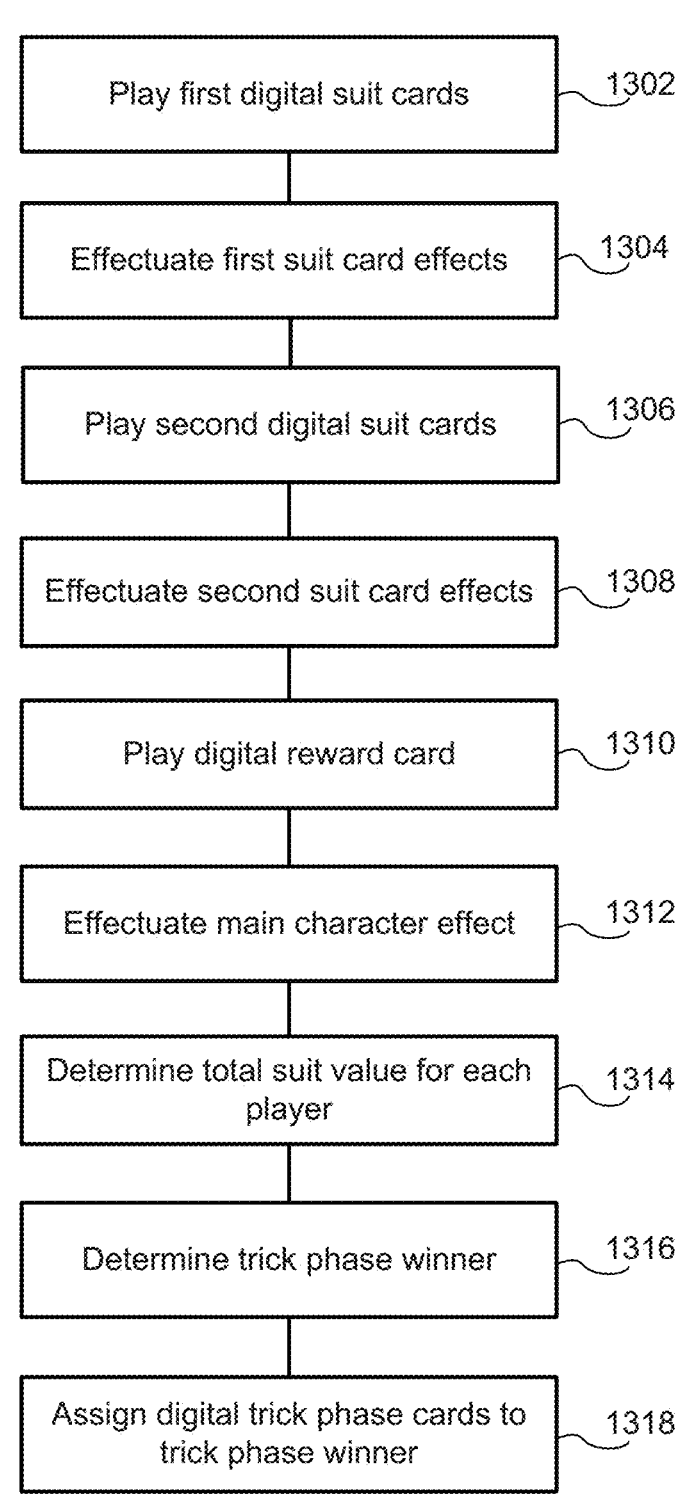
FIG. 13 illustrates a flowchart of an exemplary method for conducting a trick phase on a digital game system, in accordance with various examples.

With additional reference to FIG. 13 depicting a method 1300 for conducting a trick phase during a game, during the trick phase, a first trick play and a second trick play can occur. During the first trick play, each player plays a first digital suit card in a first player sequence. During the second digital trick play, each player plays a second digital suit card in a second player sequence. In various examples, the first and second player sequences can be the same. In various examples, the second player sequence can be different from, and/or the reverse of, the first player sequence. For example, the first player sequence of the first trick play can start with the first player and proceed to the left, clockwise, or the like, and the second player sequence of the second trick play can start with the last player from the first player sequence and proceed to the right, counterclockwise, or the like.

In various examples, proceeding with the trick phase, the players can play first digital suit cards (step 1302). For example, the first player can select a digital suit card from first player hand 1160 (e.g., by clicking on an image of a digital suit card in first player hand 1160, which can be an input device). The processor can receive such a selection. The processor can remove the selected digital suit card from first player hand 1160 and present it faceup and visible on the GUI to the other players (e.g., the opponent). The player who plays first in a trick phase can be any desired player, such as the player who was last ranked in a previous trick phase. For the first trick phase, player order can be determined in any suitable manner, such as randomly (e.g., by the processor randomly selecting player order). The card suit of the first player digital suit card can establish a first chosen suit for the first trick play of the respective trick phase. In response to the first player playing the first player digital suit card, the first player sequence can proceed with the opponent selecting a digital suit card from opponent hand 1170 (e.g., by clicking on an image of a digital suit card in opponent hand 1170, which can be an input device). The processor can receive such a selection. The processor can remove the selected digital suit card from opponent hand 1170 and present it faceup and visible on the GUI to the other players (e.g., the first player). The first player sequence can continue with any other players playing respective digital suit cards from their hands in the first player sequence (e.g., proceeding to the left, clockwise, and/or the like).

Digital suit cards played by subsequent players after the first player of a player sequence during a trick play can play digital suit cards that comprise the chosen suit established by the first digital suit card played during the trick play, or a different suit. In response to a player selecting a digital suit card to play having a card suit that is the same as the chosen suit, the processor can confirm that the card suit of the selected digital suit card matches the chosen suit, and accordingly, the suit value of the played digital suit card can contribute to the respective player's total suit value at the end of a trick phase. In response to a player selecting a digital suit card to play having a card suit that is different than the chosen suit (an off-suit card), the processor can determine that the card suit of the selected digital suit card is different than the chosen suit, and the suit value of the played suit card may not contribute to the respective player's total suit value at the end of a trick phase. In response to a player playing an off-suit card, the processor can effectuate the suit card effect of the digital suit card, and then the processor can assign the off-suit digital suit card as damage to an active digital enemy card. The active digital enemy card to receive the off-suit digital suit card as damage can be selected by the player, and the processor can receive such selection. Accordingly, continuing with the example above, the first opponent digital suit card can comprise the first chosen suit or a different suit. The processor can present the first digital suit card played by each player face up on the GUI for viewing by all players.

In response to the first player playing the first player digital suit card, the processor can effectuate the suit card effect of the first player digital suit card (step 1304). Effectuation of the first player suit card effect can occur before or after the opponent plays the first opponent digital suit card. A suit card effect of a digital suit card can have any desired effect, such as those discussed with regard to the suit cards of game system 100 herein.

In response to the opponent playing the first opponent digital suit card, the processor can effectuate the suit card effect of the first opponent digital suit card (step 1304). Effectuation of the suit card effect of the first opponent digital suit card can occur before, during, or after effectuation of the suit card effect of the first player digital suit card.

In response to completion of the first trick play (e.g., all players playing their respective first suit card and effectuation of the associated suit card effect), the players can play their second digital suit cards (step 1306) by selecting another digital suit card from the respective hand on GUI 1100, and the processor can receive such selections and effectuate the associated second suit cards effects (step 1308) in the second trick play of the trick phase. As discussed herein, the second player sequence (i.e., player order) for the second trick play can be the reverse of the first player sequence (i.e., player order) for the first trick play (playing the players' first suit cards) (e.g., to the right, counterclockwise, and/or the like). Thus, the player who played their digital suit card last in the previous trick play can go first in the subsequent trick play (thus, that player can play two digital suit cards in a row). Continuing with the above example, for the second trick play, the opponent can select a second opponent digital suit card to play, and the processor can receive such a selection. The processor can remove the selected digital suit card from opponent hand 1170 and present it faceup and visible on the GUI to the other players (e.g., the first player). The card suit of the first-played digital suit card in a subsequent trick play during a trick phase (e.g., the second trick play) may not be required to comprise a card suit established in a previous trick play. According, the first digital suit card played during the second trick play can establish a second chosen suit. In response to the opponent playing the second opponent digital suit card, the processor can effectuate the suit card effect of the second opponent suit card.

Continuing with the above example, in response to the opponent playing the second opponent digital suit card and/or the processor effectuating the associated suit card effect, the first player can select a second player digital suit card to play, and the processor can receive such a selection. The processor can remove the selected digital suit card from first player hand 1160 and present it faceup and visible on the GUI to the other players (e.g., the opponent). The processor can effectuate the suit card effect associated with the selected second player digital suit card. The suit card effects of the second opponent digital suit card and the second player digital suit card can be effectuated in the order in which such digital suit cards were played, or at the same time.

In various examples, a player can select a digital reward card to play (step 1310) during a trick phase. The processor can receive such a selection and effectuate the associated reward card effect. A digital reward card effect can have any desired effect, as discussed herein (e.g., with regard to reward card effects of reward cards of game system 100). A digital reward card can be played at any suitable time (e.g., before, during, or after a trick phase). For example, a player can play a digital reward card during the player's turn to play a digital suit card during a trick play of a trick phase. The processor can effectuate the reward card effect of the played digital reward card in response to receiving the selection of the digital reward card (e.g., automatically or immediately). In response to the reward card effect being utilized, the digital reward card can be exhausted. The processor can indicate that a digital reward card is exhausted in any suitable manner, such as by presenting an exhaustion marker or symbol, changing the color of the respective digital reward card, changing the orientation of the respective digital reward card to horizontal or at an angle (e.g., a nonparallel, nonorthogonal angle) relative to an edge of the GUI (e.g., the GUI edge proximate to the respective player's digital hand), facedown, and/or the like. In various examples, there can be a limit to the number of digital reward cards played by a player during a turn or trick phase (e.g., one or two, or more), or there may be no limit.

In various examples, a player can elect to effectuate the main character effect of the player's digital main character (e.g., by selecting an input device for the same). The processor can receive such a selection, and in response, effectuate the main character effect of the respective digital main character (step 1312) during a trick phase. A main character effect can have any desired effect, as discussed herein (e.g., with regard to main character effects of main character cards of game system 100).

The processor can effectuate the main character effect of a digital main character card at any suitable time (e.g., before, during, or after a trick phase). For example, the processor can effectuate a main character effect during the respective player's turn to play a suit card during a trick play of a trick phase. The processor can effectuate the respective main character effect in response to receiving a selection or instruction to do the same (e.g., automatically or immediately). In response to the main character effect being utilized, the digital main character card can be exhausted. The processor can indicate that a digital main character card is exhausted in any suitable manner, such as by presenting an exhaustion marker or symbol, changing the color of the respective digital main character card, changing the orientation of the respective digital main character card to horizontal or at an angle (e.g., a nonparallel, nonorthogonal angle) relative to an edge of the GUI (e.g., the GUI edge proximate to the respective player's digital hand), facedown, and/or the like.

A trick phase can comprise any suitable number of trick plays (e.g., during each trick play, each player plays a digital suit card in the appropriate player sequence, as discussed herein, and the processor effectuates the effect of such digital suit card and any played reward cards or main character effects). In various examples, a trick phase can comprise one, two, or three trick plays (thus, each player can play one, two, or three digital suit cards each, respectively). In various examples, a trick phase can comprise two trick plays (thus, each player can play two digital suit cards).

In response to the trick plays of a trick phase being completed, the processor can determine the total suit value for each player (step 1314) for the trick phase. The total suit value for each player for a trick phase can be the sum of the suit values of all digital suit cards played or added by the respective player during a trick phase. Continuing with the above example, to determine the total suit value for the first player, the processor can add the suit values of the first and second player suit cards played during such the trick phase, along with any added digital suit cards and/or suit value adjustments (e.g., additions or subtractions) resulting from suit card effects, reward effects, and/or main character effects, as discussed herein. To determine the total suit value for the opponent, the processor can add the suit values of the first and second opponent digital suit cards played during the trick phase, along with any added digital suit cards and/or suit value adjustments (e.g., additions or subtractions) resulting from suit card effects, reward effects, and/or main character effects, as discussed herein (added digital suit cards being cards added to the played digital suit cards and placed facedown without effectuation of the associated suit card effect, as discussed herein in relation to added suit cards in game system 100).

In response to determining the total suit values for each player, the processor can determine a trick phase winner (step 1316). In various examples, the trick phase winner can be the player having the highest total suit value. Accordingly, the processor can compare the total suit values for each player and determine which player has the highest. The processor can determine the player with the highest total suit value to be the trick phase winner. In response to there being a tie between two or more players having the highest total suit value, the processor can compare the digital suit card for each player having the greatest suit value and determine the player with the higher suit value to be the trick phase winner. If there is still a tie, there can be a hierarchy of card suits, so the processor can determine the higher card suit of the greatest suit value digital suit card wins. If there is still a tie, the processor can continue this process with the digital suit card having the second highest value for each player, etc. In various examples, the processor can determine the trick phase winner in response to a main character effect, a reward effect, and/or a suit card effect (e.g., determining that a certain player is automatically the trick phase winner). In response to such a main character effect, a reward effect, and/or a suit card effect, the processor can determine the trick phase winner (despite the total suit value for each player).

As part of determining the trick phase winner, the processor can determine a ranking of players. The processor can determine a ranking of players based on the total suit value for each player. For example, the trick phase winner can be the player with the highest total suit value (or as declared by a main character effect, a reward effect, and/or a suit card effect), so the processor can determine the trick phase winner to have a first rank for the respective trick phase. The processor can rank the remaining players from highest to lowest after the trick phase winner in descending order based on their respective total suit values. For example, the processor can determine the player with the highest total suit value after the trick phase winner to be ranked second (e.g., in various examples, second highest total suit value overall), the player with the highest total suit value after the second ranked player to be ranked third (e.g., in various examples, third highest total suit value overall), the player with the highest total suit value after the third ranked player to be ranked fourth (e.g., in various examples, fourth highest total suit value overall), and so on.

In various examples, all digital suit cards played or added by the players during a trick phase can be referred to as "digital trick cards." In response to determining the trick phase winner, the processor can assign the digital trick cards to the trick phase winner (step 1318) from the trick phase (e.g., all played and added digital trick cards, excluding any off-suit digital suit cards played, which have been assigned as damage to an active enemy card). The processor can associate the digital trick cards with the player determined to be the trick phase winner. A trick phase may end upon the trick cards being assigned to the trick phase winner.

Referring back to FIG. 12, in response to conclusion of a trick phase, method 1200 can continue by the trick phase winner assigning damage to active digital enemy cards. In various examples, each digital trick card can equal one damage that can be assigned to an active digital enemy card. In various examples, each digital trick card can equal an amount of damage equal to the suit value of the respective digital trick card. Each digital trick card can be assigned to an active digital enemy card, dealing the respective amount of damage to the assigned active digital enemy card (e.g., one damage per assigned trick card). The digital trick cards can be assigned in any number and combination to one or more active digital enemy cards. Each digital trick card may only be able to be assigned to one active digital enemy card (i.e., a single digital trick card may not be assigned to multiple active digital enemy cards). In various examples, all digital trick cards can be assigned to an active digital enemy card.

To assign the digital trick cards to active digital enemy cards, the respective player may select on GUI 1100 the active digital enemy cards and which digital trick cards to assign thereto. The processor can receive such selections and assign the digital trick cards to the selected active digital enemy cards (step 1212). For example, with the example involving the first player and the opponent, the trick phase winner may be assigned four digital trick cards (e.g., from two digital suit cards played by each player). Accordingly, the trick phase winner can select which digital trick cards will be assigned to which active digital enemy cards 1135A-C. For example, the player may select three digital trick cards to be assigned to digital enemy card 1135B and one digital trick card to active digital enemy card 1135C. In response, the processor can make such assignments. The processor can indicate the damage associated with each active digital enemy card in any suitable manner. For example, the processor can decrease the respective active digital enemy card's enemy hit point value on the active digital enemy card itself (e.g., decreasing the enemy hit point value of digital enemy card 1135B to zero in response to assigning three damage (digital trick cards) thereto). As another example, the processor can stack the assigned digital trick cards under the respective active digital enemy card so the players can see how many cards are associated with such active digital enemy card. As another example, the processor can present indicators or markers on or proximate the respective active digital enemy card (e.g., dots or X's) to indicate the amount of damage associated therewith.

In response to all trick cards being assigned to active enemy cards, the processor can determine status of each active digital enemy card (step 1214). The processor can compare the amount of damage (e.g., the number of digital trick cards) to the enemy hit point value or remaining hit points for the respective active digital enemy card. In response to an active digital enemy card receiving an amount of damage equal to or greater than the remaining enemy hit points, the processor can determine that the active digital enemy card is defeated. In response to an active digital enemy card receiving an amount of damage that is less than the remaining enemy hit points, the processor can determine that such an active digital enemy card is not defeated, and the processor keeps such active digital enemy card active, leaving the assigned damage associated therewith.

In response to an active enemy card being defeated, the processor can draw a digital reward card. A certain number of digital reward cards (which can be any suitable number) can be drawn for each digital enemy card defeated. For example, one digital reward can be drawn from the digital reward card deck for each active digital enemy card defeated. The digital reward card drawn can comprise a reward rating equal to or less than the enemy rating of the respective defeated digital enemy card. Thus, the digital reward card drawn can be drawn from the appropriate digital reward card stack having digital reward cards with the appropriate reward rating. Such digital reward cards drawn can be randomly selected by the processor from the digital reward card deck and/or can be the first or top digital reward cards in the randomized (i.e., shuffled) digital reward card deck. The processor can reveal the drawn digital reward card(s) or present them on the GUI facedown.

The processor can distribute the drawn digital reward cards (step 1216). In various examples, the trick phase winner can have first pick of the drawn digital reward cards. The processor can receive the trick phase winner's selection, and in response, can add the selected digital reward card faceup on the GUI to the trick phase winner's digital reward cards. In response to only one digital reward card being drawn, the processor can automatically assign the digital reward card to the trick phase winner. In response to multiple digital reward cards being drawn, the trick phase winner first chooses a desired digital reward card, and the processor receives such a selection, reveals the selected digital reward card and assigns it to the trick phase winner (faceup on the GUI). Then the other players each can choose a digital reward card in order of their ranking from the trick phase (e.g., the second-ranked player gets second choice of the drawn digital reward cards, the third-ranked player gets third choice of the drawn digital reward cards, etc.). The drawn digital reward cards, in various examples, can remain facedown until selected, or the drawn digital reward cards can be revealed before selection.

In response to an active digital enemy card being defeated by some other action besides assignment of digital trick cards (e.g., by assigning an off-suit digital suit card to an active enemy card as damage, by defeating an active digital enemy card from a main character effect, a reward effect, and/or a suit card effect, and/or the like), the processor can automatically assign the drawn digital reward card to the player responsible for the action or damage that caused the active digital enemy card to be defeated.

In various examples, in response to the most-recently activated or revealed digital enemy card being defeated, the processor can automatically reveal a new enemy card to take the defeated enemy card's place.

In response to all drawn reward cards being assigned to a player, the processor can determine a victory point amount for each player (step 1218). The victory point amount for each player can be the sum of all victory points acquired by such player. The digital reward cards possessed by a player each have a victory point value, and therefore, the processor can add the victory point values of all of a player's digital reward cards to determine the victory point amount for that player. In order to win the game, a player can accumulate a victory point amount that equals or exceeds a victory point threshold. Accordingly, the processor can compare each player's victory point amount to the victory point threshold. In response to a player having a victory point amount that equals or exceeds a victory point threshold, the processor can determine that that player is the winner of the game (step 1222).

In response to a tie between two or more players that meet or exceed the victory point threshold, the processor can compare the number of digital reward cards that each player has, and determine that the player with the most digital reward cards (or, in another example, with the fewest digital reward cards) wins. If the tied players have the same number of digital reward cards, then the processor can compare the remaining hit points for each player's digital main character, and determine that the player with the digital main character having the most remaining hit points (or, in another example, with the fewest remaining hit points) wins.

In response to no players accumulating a victory point amount that equals or exceeds the victory point threshold, the processor can advance the game to the next round (step 1220). For a subsequent round, method 1200 can return to step 1206 to conduct another round 1220. Any damage assigned to an active digital enemy card can remain with such active digital enemy card. The digital suit cards remaining in each player's hand can remain. A player may not draw additional digital suit cards (unless the player does not have enough digital suit cards in the player's hand to complete the next trick phase, in which case the processor can reload the player's hand, as discussed herein). The next round can begin by the processor revealing a new active digital enemy card from the digital enemy card deck and dealing damage from the active digital enemies, as discussed herein with relation to step 1206. As discussed, the newly-revealed active digital enemy card may not deal damage in the same round in which it is revealed. Digital enemy cards that became active in a previous round can deal damage to each player's digital main character card. When conducting a trick phase in a subsequent round, the processor can determine last (or first) ranked player from the previous round, and can cause such player to play a digital suit card first in the first trick play (i.e., that player gets to go first). Rounds in a game can be conducted in any number until one or more players achieve a victory point amount that equals or exceeds the victory point threshold.

The game and game components disclosed herein, in both physical and electronic versions, may incorporate reasonable design parameters, features, modifications, advantages, and variations that are readily apparent to those skilled in the art in the field of the game design and/or the game industry.

Although a number of different examples and embodiments of the game systems described herein and corresponding methods of playing the game systems have been illustrated and described herein, one or more features of any one embodiment can be combined with one or more features of one or more of the other embodiments.

While a number of exemplary aspects and embodiments of the game system and corresponding method of play have been discussed above, those of skill in the art will recognize certain modifications, permutations, additions and sub-combinations thereof. It is therefore intended that the following appended claims and claims hereafter introduced are interpreted to include all such modifications, permutations, additions, and sub-combinations as are within their true spirit and scope.

Systems, methods and computer program products are provided. In the detailed description herein, references to "various examples", "one example", "an example", etc., indicate that the example described can include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. After reading the description, it will be apparent to one skilled in the relevant art(s) how to implement the disclosure in alternative examples.

As used herein, "satisfy", "meet", "match", "associated with" or similar phrases can include an identical match, a partial match, meeting certain criteria, matching a subset of data, a correlation, satisfying certain criteria, a correspondence, an association, an algorithmic relationship and/or the like.

Terms and phrases similar to "associate" and/or "associating" can include tagging, flagging, correlating, using a look-up table or any other method or system for indicating or creating a relationship between elements, such as, for example, (i) a suit card effect, card type, or suit value (ii), a suit card, and/or (iii) a player or player hand. Moreover, the associating can occur at any point, in response to any suitable action, event, or period of time. The associating can occur at pre-determined intervals, periodic, randomly, once, more than once, or in response to a suitable request or action. Any of the information can be distributed and/or accessed via a software enabled link, wherein the link can be sent via an email, text, post, social network input and/or any other method known in the art.

Unless specifically stated otherwise, as apparent from the discussion herein, it is appreciated that throughout this specification, discussions utilizing terms such as "processing," "computing," "calculating," "determining" or the like refer to actions or processes of a processor, such as a processor on a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display screens of the special purpose computer or similar special purpose electronic computing device.

The system and method can be described herein in terms of functional block components, screen shots, optional selections and various processing steps. It should be appreciated that such functional blocks can be realized by any number of hardware and/or software components configured to perform the specified functions. For example, the system can employ various integrated circuit components, e.g., memory elements, processing elements, logic elements, look-up tables, and the like, which can carry out a variety of functions under the control of one or more microprocessors or other control devices. Similarly, the software elements of the system can be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system can employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module can take the form of a processing apparatus executing code, an internet-based example, an entirely hardware example, or an example combining aspects of the internet, software and hardware. Furthermore, the system can take the form of a computer program product on a computer-readable storage medium having computer-readable program code means embodied in the storage medium. Any suitable computer-readable storage medium can be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various examples. It will be understood that each functional block of the block diagrams and the flowchart illustrations, and combinations of functional blocks in the block diagrams and flowchart illustrations, respectively, can be implemented by computer program instructions.

These computer program instructions can be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions can also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein can comprise in any number of configurations including the use of WINDOWS®, webpages, web forms, popup WINDOWS®, prompts and the like. It should be further appreciated that the multiple steps as illustrated and described can be combined into single webpages and/or WINDOWS® but have been expanded for the sake of simplicity. In other cases, steps illustrated and described as single process steps can be separated into multiple webpages and/or WINDOWS® but have been combined for simplicity.

For clarity in discussing the various functions of the system, multiple computers and/or servers are discussed as performing different functions. These different computers (or servers) can, however, be implemented in multiple different ways such as modules within a single computer, as nodes of a computer system, etc. The functions performed by the system (or nodes or modules) can be centralized or distributed in any suitable manner across the system and its components, regardless of the location of specific hardware. Furthermore, specific components of the system can be referenced using functional terminology in their names. The function terminology is used solely for purposes of naming convention and to distinguish one element from another in the following discussion. Unless otherwise specified, the name of an element conveys no specific functionality to the element or component. It should be appreciated that, in various examples, the software, hardware, and associated components of the system can be programmed and configured to implement one or more examples described herein. It should also be appreciated that the various aspects of the system can be exemplified as software, modules, nodes, etc., of a computer or server.

As used herein, "transmit," "transfer," and/or the like can include sending electronic data from one system component to another over a network connection. Additionally, as used herein, "data" can include encompassing information such as commands, queries, files, data for storage, and the like in digital or any other form.

As used herein, the term "network" includes any cloud, cloud computing system or electronic communications system or method which incorporates hardware and/or software components. Communication among the parties can be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system can also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific examples. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone can be present in an example, B alone can be present in an example, C alone can be present in an example, or that any combination of the elements A, B and C can be present in a single example; for example, A and B, A and C, B and C, or A and B and C. Although the disclosure includes a method, it is contemplated that it can be embodied as computer program instructions on a tangible computer-readable carrier, such as a magnetic or optical memory or a magnetic or optical disk. All structural, chemical, and functional equivalents to the elements of the above-described various examples that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

No claim element is intended to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. A method of playing a game on a game surface, comprising:

providing an original card deck comprising a suit card deck, an enemy card deck, a reward card deck, and a main character card deck, wherein the suit card deck comprises 50 to 70 suit cards each having a card suit, a card type, a suit card effect, and a suit value, and wherein there are at least three card suits and at least three card types in the suit card deck, wherein the suit card effect affects at least one of hit points of a main character card, cards played or added during a trick phase of the game, hit points of an enemy card, or a number of cards in a player's hand, wherein the enemy card deck comprises 20 to 30 enemy cards, wherein each enemy card comprises an enemy hit point value, an enemy damage effect, an enemy rating, and an enemy block type, and wherein the reward card deck comprises 20 to 30 reward cards, wherein each reward card comprises a reward card effect, a reward rating, and a reward victory point value, wherein the reward card effect affects at least one of hit points of a main character, cards played or added during a trick phase, damage to an enemy card, or a number of cards in a player's hand;

selecting, by a first player, a player main character card from the main character deck comprising at least three player main character cards, wherein the player main character card comprises a player hit point value and a player main character effect;

selecting, by a second player, which is an opponent of the first player, an opponent main character card from the main character deck, wherein the opponent main character card comprises an opponent hit point value and an opponent main character effect;

conducting a first trick phase, wherein there is at least one active enemy card from the enemy card deck that is disposed on the game surface faceup, comprising:

playing, by the first player, a first player suit card faceup from a player hand comprising a first chosen suit, a first player suit card effect, and a first player suit value;

effectuating the first player suit card effect of the first player suit card;

playing, by the opponent, a first opponent suit card faceup from an opponent hand comprising the first chosen suit, a first opponent suit card effect, and a first opponent suit value;

effectuating the first opponent suit card effect of the first opponent suit card;

playing, by the opponent, a second opponent suit card faceup from the opponent hand comprising a second chosen suit, a second opponent suit card effect, and a second opponent suit value;

effectuating the second opponent suit card effect of the second opponent suit card;

playing, by the first player, a second player suit card faceup from the player hand comprising the second chosen suit, a second player suit card effect, and a second player suit value, wherein the first player suit card, the second player suit card, the first opponent suit card, and the second opponent suit card are trick cards;

effectuating the second player suit card effect of the second player suit card;

determining a player total suit value, which is a total of the first player suit value and the second player suit value;

determining an opponent total suit value, which is a total of the first opponent suit value and the second opponent suit value;

comparing the player total suit value and the opponent total suit value to determine a trick phase winner of the trick phase; and collecting, by the trick phase winner, the trick cards;

assigning, by the trick phase winner, each trick phase card to a desired active enemy card of the at least one active enemy card as a damage card to the desired active enemy card;

determining a remaining enemy hit point level of the desired active enemy card based on the enemy hit point value of the desired active enemy and the trick cards assigned to the desired active enemy; and in response to the remaining enemy hit point level of the desired active enemy card being zero, drawing, by the trick phase winner, a reward card from the reward card deck.

2. The method of claim 1, wherein the reward card drawn comprises a reward rating that is equal to an enemy rating of the desired active enemy card.

3. The method of claim 1, further comprising:

in response to the drawing a reward card, determining a player victory point amount for the trick phase winner including the reward victory point value of the drawn reward card; and in response to the player victory point amount equaling or exceeding a victory point threshold, determining the trick phase winner to be a winner of the game.

4. The method of claim 1, further comprising, before conducting the first trick phase:

drawing, by the first player, a hand number of player suit cards from the suit card deck to create the player hand; and drawing, by the opponent, the hand number of opponent suit cards from the suit card deck to create the opponent hand.

5. The method of claim 4, further comprising, before the conducting the first trick phase:

applying damage to at least one of the player main character card and the opponent main character card for the enemy damage effect of the at least one active enemy card; and in response, determining remaining hit points of the player hit point value for the player main character card and remaining hit points of the opponent hit point value for the opponent main character card.

6. The method of claim 5, further comprising, before conducting the first trick phase:

revealing at least one enemy card from the enemy card deck, wherein the at least one enemy card and the at least one active enemy card are a plurality of active enemy cards.

7. The method of claim 6, wherein the assigning each trick card to a desired active enemy card comprises assigning, by the trick phase winner, at least one of the trick cards to each of at least two of the plurality of active enemy cards, wherein the method further comprises:

determining remaining hit point levels of the at least two of the plurality of active enemy cards based on each enemy hit point value of the at least two of the plurality of active enemy cards and the number of trick cards assigned to the desired active enemy card; and in response to the remaining hit point levels of the at least two of the plurality of active enemy cards being zero, the at least two of the plurality of active enemy cards are defeated enemy cards, wherein the drawing the reward card comprises drawing a reward card from the reward deck for each of the defeated enemy cards.

8. The method of claim 7, wherein the conducting the first trick phase further comprises determining a player rank in response to the comparing the player total suit value and the opponent total suit value, wherein the trick phase winner is a first ranked player, wherein the method further comprises:

selecting, by the first ranked player, a first of the drawn reward cards; and selecting, by a second ranked player, a second of the drawn reward cards.

9. The method of claim 6, wherein the applying damage to the player main character card and the opponent main character card based on the enemy damage effect of the at least one active enemy card comprises:

applying damage to the player main character card and the opponent main character card for the enemy damage effect of each of the plurality of active enemy cards.

10. The method of claim 5, wherein the effectuating the first player suit card effect comprises adding a healing number of hit points to the remaining hit points of the player hit point value.

11. The method of claim 5, further comprising discarding, by the first player, an un-played suit card from the player hand having a card type that matches the enemy block type of the at least one active enemy card, wherein the applying damage to at least one of the player main character card and the opponent main character card comprises applying damage to only the opponent main character card.

12. The method of claim 4, wherein the conducting the first trick phase further comprises:

playing, by the first player, a first reward card; and effectuating the reward card effect of the first reward card.

13. The method of claim 1, further comprising, prior to the conducting the first trick phase, revealing a first enemy card from the enemy card deck, which becomes a first active enemy card.

14. The method of claim 1, wherein the effectuating the first player suit card effect comprises adding, by the first player, a first added player suit card facedown to the faceup first player suit card, and wherein the determining the player total suit value comprises adding the first player suit value of the first player suit card, the second player suit value of the second player suit card, and an added suit value of the first added player suit card.

15. A system comprising:

a user device comprising a display screen;

a processor operably connected to the user device; and a tangible non-transitory computer readable memory configured to communicate with the processor, the tangible non-transitory computer readable memory having instructions stored thereon that, in response to execution by the processor causes the processor to perform operations comprising:

displaying, by the processor, a player digital main character card on a graphical user interface (GUI), wherein the player digital main character card comprises a player hit point value and a player main character effect;

displaying, by the processor, an opponent digital main character card on the GUI, wherein the opponent digital main character card comprises an opponent hit point value and an opponent main character effect;

presenting, by the processor, at least one active digital enemy card faceup on the GUI comprising a first enemy hit point value, a first enemy damage effect, a first enemy rating, and a first enemy block type;

conducting a first trick phase, comprising:

receiving, by the processor, a selection of a first player digital suit card from a player digital hand comprising a first chosen suit, a first player suit card effect, and a first player suit value;

presenting, by the processor, the selected first player digital suit card faceup on the GUI separate from the player digital hand;

effectuating, by the processor, the first player suit card effect of the first player digital suit card;

receiving, by the processor, a selection of a first opponent digital suit card from an opponent digital hand comprising the first chosen suit, a first opponent suit card effect, and a first opponent suit value;

presenting, by the processor, the selected first opponent digital suit card faceup on the GUI separate from the opponent digital hand;

effectuating, by the processor, the first opponent suit card effect of the first opponent digital suit card;

receiving, by the processor, a selection of a second opponent digital suit card from the opponent digital hand comprising a second chosen suit, a second opponent suit card effect, and a second opponent suit value;

presenting, by the processor, the selected second opponent digital suit card faceup on the GUI separate from the opponent digital hand;

effectuating, by the processor, the second opponent suit card effect of the second opponent digital suit card;

receiving, by the processor, a selection of a second player digital suit card from the player digital hand comprising the second chosen suit, a second player suit card effect, and a second player suit value, wherein the first player digital suit card, the second player digital suit card, the first opponent digital suit card, and the second opponent digital suit cards are digital trick cards;

presenting, by the processor, the selected second player digital suit card faceup on the GUI separate from the player digital hand;

effectuating, by the processor, the second player suit card effect of the second player digital suit card;

determining, by the processor, a player total suit value, which is the total of the first player suit value and the second player suit value;

determining, by the processor, an opponent total suit value, which is the total of the first opponent suit value and the second opponent suit value;

comparing, by the processor, the player total suit value and the opponent total suit value;

determining, by the processor, a trick phase winner of the trick phase based on the comparing the player total suit value and the opponent total suit value; and assigning, by the processor, the digital trick cards to the trick phase winner;

receiving, by the processor, an assignment selection from the trick phase winner comprising an active digital enemy card of the at least one active digital enemy card to which to assign each of the digital trick cards;

assigning, by the processor, each of the digital trick cards to the selected active digital enemy card;

determining, by the processor, a remaining hit point level of the selected active digital enemy card based on an enemy hit point value of the selected active digital enemy card and the number of digital trick cards assigned to the selected active digital enemy card;

in response to the remaining hit point level of the selected active digital enemy card being zero, drawing, by the processor and a random number generator, a digital reward card from a digital reward card deck, wherein the digital reward card deck comprises 20 to 30 digital reward cards, wherein each digital reward card comprises a reward card effect, a reward rating, and a reward victory point value, wherein the reward card effect affects at least one of hit points of a digital main character, digital cards played or added during a trick phase, damage to a digital enemy card, or a number of digital cards in a player's hand; and assigning, by the processor, the drawn digital reward card to the trick phase winner.

16. The system of claim 15, wherein the operations further comprise:

assigning, by the processor, a first reward victory point value of the drawn digital reward card to the trick phase winner in response the assigning the digital reward card;

determining, by the processor, a player victory point amount for the trick phase winner in response to assigning the first reward victory point value to the trick phase winner;

comparing, by the processor, the player victory point amount to a victory point threshold; and determining, by the processor, the trick phase winner to be a winner of the game in response to the player victory point amount equaling or exceeding the victory point threshold.

17. The system of claim 15, wherein the operations further comprise:

determining, by the processor, an enemy rating associated with the selected active digital enemy card, wherein the reward rating of the drawn digital reward card is equal to the enemy rating.

18. The system of claim 15, wherein the operations further comprise, before conducting the first trick phase:

drawing, by the processor and the random number generator, a number of player digital suit cards from a digital suit card deck to create the player digital hand, wherein the digital suit card deck comprises between 50 and 70 digital suit cards, each having a card suit, a card type, a suit card effect, and a suit value, and wherein there are at least three card suits and at least three card types in the digital suit card deck, wherein the suit card effect affects at least one of hit points of a digital main character card, digital cards played or added during a trick phase, damage to a digital enemy card, or a number of digital cards in a player's hand; and drawing, by the processor and the random number generator, a number of opponent digital suit cards from the digital suit card deck to create the opponent digital hand.

19. The system of claim 18, wherein the operations further comprise, before playing the first player digital suit card:

drawing, by the processor and the random number generator, at least one digital enemy card from a digital enemy card deck, wherein the at least one digital enemy card and the at least one active digital enemy card are a plurality of active digital enemy cards, wherein the digital enemy card deck comprises 20 to 30 digital enemy cards, wherein each digital enemy card comprises an enemy hit point value, an enemy damage effect, an enemy rating, and an enemy block type; and applying, by the processor, damage to at least one of the player digital main character card and the opponent digital main character card for the enemy damage effect of each of the plurality of active digital enemy cards.

20. The system of claim 18, wherein the operations further comprise:

receiving, by the processor, selection of an un-played suit card from the player digital hand having a card type that matches the first enemy block type of the at least one active digital enemy card;

applying, by the processor, damage only to the opponent digital main character card for the enemy damage effect of the at least one active enemy card;

discarding, by the processor, the un-played suit card from the player digital hand; and in response, determining, by the processor, remaining hit points of the opponent hit point value for the opponent digital main character card.

* * * * *